(12) United States Patent
Cheon et al.

(10) Patent No.: US 10,114,463 B2
(45) Date of Patent: Oct. 30, 2018

(54) DISPLAY APPARATUS AND METHOD FOR CONTROLLING THE SAME ACCORDING TO AN EYE GAZE AND A GESTURE OF A USER

(71) Applicant: Samsung Electronics Co., Ltd., Gyeonggi-do (KR)

(72) Inventors: Ka-won Cheon, Seoul (KR); Hyun-jin Kim, Seoul (KR); Choon-kyoung Moon, Gyeonggi-do (KR); Jae-yeon Rho, Seoul (KR); Seong-hoon Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 106 days.

(21) Appl. No.: 14/872,865

(22) Filed: Oct. 1, 2015

(65) Prior Publication Data
US 2016/0098093 A1    Apr. 7, 2016

(30) Foreign Application Priority Data

Oct. 1, 2014 (KR) .................. 10-2014-0132664

(51) Int. Cl.
*G06F 3/01* (2006.01)
*G06F 3/0481* (2013.01)
(Continued)

(52) U.S. Cl.
CPC .............. *G06F 3/017* (2013.01); *G06F 3/013* (2013.01); *G06F 3/038* (2013.01); *G06F 3/0484* (2013.01);
(Continued)

(58) Field of Classification Search
CPC ... G06F 6/013; G06F 6/017; G06F 2203/0381
See application file for complete search history.

(56) References Cited

U.S. PATENT DOCUMENTS 6,111,580 A    8/2000 Kazama et al.
7,167,195 B2   1/2007 Kimata et al.
(Continued)

FOREIGN PATENT DOCUMENTS

CN    1303218    7/2001
CN    102082941  6/2011
(Continued)

OTHER PUBLICATIONS

European Search Report dated Feb. 26, 2016 issued in counterpart application No. 15187944.2-1908, 7 pages.
(Continued)

*Primary Examiner* — Xuemei Zheng
(74) *Attorney, Agent, or Firm* — The Farrell Law Firm, P.C.

(57) ABSTRACT

A display apparatus is provided. The display apparatus includes a communication interface unit configured to receive eye gaze information of a user and user gesture information from an external apparatus; a display unit configured to display a preset screen; and a controlling unit configured to control the display unit so that a preset object is displayed on the preset screen if it is determined that an eye gaze of the user is directed toward the preset screen using the received eye gaze information and a user gesture corresponding to the received gesture information is sensed.

20 Claims, 32 Drawing Sheets

(51) Int. Cl.
  *G06F 3/0484* (2013.01)
  *H04N 21/41* (2011.01)
  *H04N 21/422* (2011.01)
  *G06F 3/038* (2013.01)

(52) U.S. Cl.
  CPC ..... *G06F 3/04845* (2013.01); *H04N 21/4126* (2013.01); *H04N 21/42204* (2013.01); *G06F 2203/0381* (2013.01)

(56) References Cited

U.S. PATENT DOCUMENTS

| | | | |
|---|---|---|---|
| 8,560,976 | B1 | 10/2013 | Kim |
| 8,896,531 | B2 | 11/2014 | Minnen |
| 9,086,726 | B2 | 7/2015 | Setiawan et al. |
| 9,746,931 | B2 | 8/2017 | Setiawan et al. |
| 9,748,931 | B2 | 8/2017 | Setiawan Et Ai |
| 2001/0011951 | A1 | 8/2001 | Kimata et al. |
| 2005/0243054 | A1 | 11/2005 | Beymer et al. |
| 2011/0129196 | A1 | 6/2011 | Hayashi |
| 2012/0162409 | A1 | 6/2012 | Setiawan et al. |
| 2012/0262386 | A1* | 10/2012 | Kwon ............... G06F 3/04886 345/173 |
| 2013/0169560 | A1* | 7/2013 | Cederlund ............ G06F 3/013 345/173 |
| 2014/0111420 | A1 | 4/2014 | Ahn et al. |
| 2014/0247210 | A1 | 9/2014 | Henderek et al. |
| 2014/0292665 | A1* | 10/2014 | Lathrop ................ G06F 3/013 345/173 |
| 2015/0033130 | A1* | 1/2015 | Scheessele ............. G06F 3/00 715/728 |
| 2015/0301612 | A1 | 10/2015 | Setiawan et al. |
| 2016/0089980 | A1* | 3/2016 | Kurahashi ............ G06F 3/013 345/156 |
| 2016/0291691 | A1* | 10/2016 | Lee ....................... G09G 3/003 |
| 2017/0212587 | A1* | 7/2017 | Noda ..................... G06F 3/013 |

FOREIGN PATENT DOCUMENTS

| | | |
|---|---|---|
| CN | 102591451 | 7/2012 |
| EP | 2 453 388 | 5/2012 |
| EP | 2 741 175 | 6/2014 |
| JP | 2002-269544 | 9/2002 |
| KR | 10-2014-0033025 | 3/2014 |
| KR | 10-2014-0050484 | 4/2014 |
| KR | 10-2014-0062315 | 5/2014 |
| WO | WO 2014/015521 | 1/2014 |

OTHER PUBLICATIONS

European Search Report dated Apr. 5, 2017 issued in counterpart application No. 15187944.2-1908, 4 pages.
Chinese Office Action dated Dec. 4, 2017 issued in counterpart application No. 201510646357.1, 16 pages.
European Search Report dated Apr. 12, 2018 issued in counterpart application No. 15187944.2-1208, 5 pages.

* cited by examiner

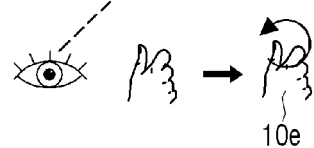
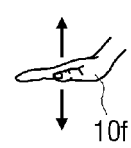

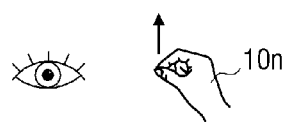

FIG. 25A  FIG. 25B
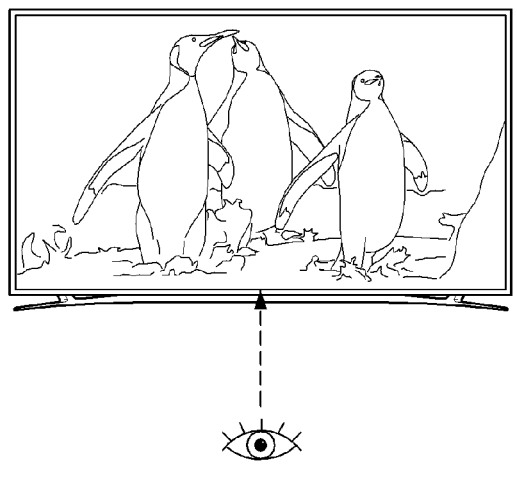
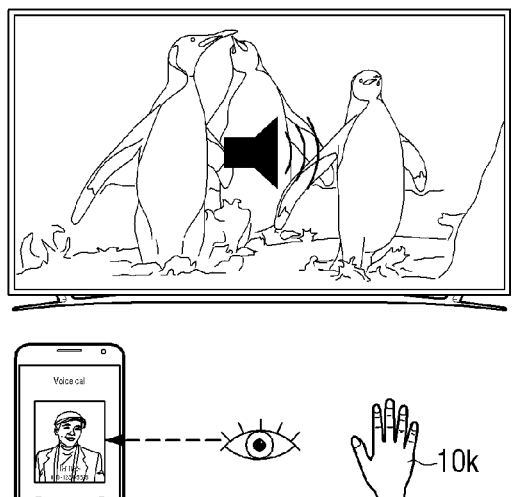
FIG. 25C
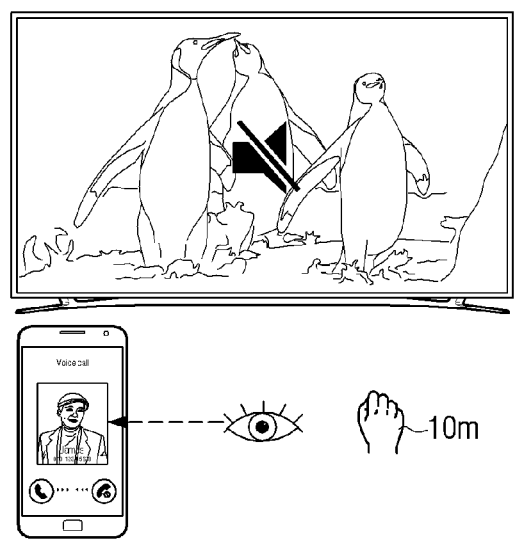

DISPLAY APPARATUS AND METHOD FOR CONTROLLING THE SAME ACCORDING TO AN EYE GAZE AND A GESTURE OF A USER

PRIORITY

This application claims priority under 35 U.S.C. § 119(a) to a Korean Patent Application filed on Oct. 1, 2014, in the Korean Intellectual Property Office, and assigned Serial No. 10-2014-0132664, the entire disclosure of which is incorporated herein by reference.

BACKGROUND

1. Field of the Invention

The present invention relates to a display apparatus and a method of controlling the same, and more particularly, to a display apparatus that may be controlled according to an intuitive motion of a user, and a method of controlling the same.

2. Description of the Related Art

A display apparatus provides various functions including a conventional broadcast receiving function. For example, a display apparatus provides various functions such as a web browsing function, a social networking service (SNS) function, a contents search function, and the like.

In addition, as many functions are provided to a display apparatus, a manipulation method provided to a display apparatus has also been diversified. For example, there is a method for controlling a display apparatus using a remote controller according to the related art. Furthermore, a control technology using voice recognition, or the like has recently been developed.

However, in the case of voice recognition, an error due to recognition inaccuracy frequently occurs and in some cases, inputs which are not intended by a user are received. In the related art, the most convenient input unit is the remote controller, because there is almost none of the above-mentioned error occurrence.

However, in controlling a display apparatus, the user is inconvenienced by always having to use a remote controller for the simplest function such as power on/off or volume adjustment.

Therefore, there is a need for a new control method capable of minimizing inaccuracy while controlling an electronic apparatus without a separate input apparatus such as a remote controller.

SUMMARY

An aspect of the present invention provides a display apparatus that may be controlled according to an intuitive motion of a user, and a method for controlling the same.

Another aspect of the present invention provides a controlling unit that may detect an eye gaze of a user on a screen.

Another aspect of the present invention provides, if it is determined that a detected eye gaze is not directed toward a position on which an object is displayed and a preset user gesture is recognized, a controlling unit that may correct the eye gaze toward a position on which an object closest to the detected eye gaze is displayed.

Another aspect of the present invention provides a controlling unit that may perform user recognition based on user input information and perform an eye gaze detection according to a recognized user.

Another aspect of the present invention provides a controlling unit that may determine a viewing state of a user from information received from an external apparatus and perform eye gaze detection according to a determined viewing state.

Another aspect of the present invention provides, if it is determined that an eye gaze of a user is directed toward a displayed object and a preset user gesture is recognized, a controlling unit may perform an event corresponding to the object to which the eye gaze of the user is directed toward and the preset user gesture.

Another aspect of the present invention provides, if an object is displayed and at least one of a user gesture and an eye gaze of the user is directed toward a screen is not recognized for at least a preset time, a controlling unit may control a display unit so that a display of the object is terminated.

Another aspect of the present invention provides a controlling unit that may display a plurality of objects, and control a display unit so that an object corresponding to an eye gaze of a user is varied and displayed if it is determined that the eye gaze of the user is directed toward any one of the plurality of objects.

Another aspect of the present invention provides a controlling unit that may vary and display an object corresponding to an eye gaze of a user, and perform an event corresponding to the varied and displayed object and a preset user gesture, if it is determined that the eye gaze of the user is not directed toward the object displayed on a screen and the preset user gesture is recognized, in a state in which the display of the varied object is maintained.

Another aspect of the present invention provides an object that may be at least one of a sound adjustment object, a channel adjustment object, a search box activation object, a keyboard object, and a guide object.

Another aspect of the present invention provides a communication interface unit that may receive user gesture information from a wearable device worn by a user.

Another aspect of the present invention provides a method that may further include detecting an eye gaze of a user toward a screen.

Another aspect of the present invention provides a method that may further include correcting an eye gaze toward a position on which an object closest to a detected eye gaze is displayed, if it is determined that the detected eye gaze does not correspond to a position on which the object is displayed and a preset user gesture is recognized.

Another aspect of the present invention provides, if an eye gaze of a user is detected, performing user recognition based on user input information and performing eye gaze detection according to a recognized user.

Another aspect of the present invention provides, if the eye gaze of a user is detected, determining a viewing state of the user from information received from an external apparatus and performing eye gaze detection according to the determined viewing state.

Another aspect of the present invention provides a method of performing an event corresponding to an object at which an eye gaze of a user is directed toward and a preset user gesture, if it is determined that the eye gaze of the user is directed toward the displayed object and the preset user gesture is recognized.

Another aspect of the present invention provides a method of terminating a display of an object, if the object is displayed and at least one of a user gesture and an eye gaze of the user directed toward a screen is not recognized for at least a preset time.

Another aspect of the present invention provides displaying of a preset object that may include displaying a plurality of objects, and varying and displaying an object corresponding to an eye gaze of a user, if it is determined that the eye gaze of the user is directed toward any one of the plurality of objects.

Another aspect of the present invention provides a method that may further include varying and displaying an object corresponding to an eye gaze of a user, and performing an event corresponding to the varied and displayed object and a preset user gesture, if it is determined that the eye gaze of the user is not directed toward the object displayed on a screen and the preset user gesture is recognized, in a state in which the display of the varied object is maintained.

Another aspect of the present invention provides that a separate apparatus such as a remote controller is not required to control a display apparatus, and rich interactions between a user and a display apparatus may be performed based on a natural action of the user.

According to an aspect of the present invention, a display apparatus is provided. The display apparatus includes a communication interface unit configured to receive eye gaze information of a user and user gesture information from an external apparatus; a display unit configured to display a preset screen; and a controlling unit configured to control the display unit so that a preset object is displayed on the preset screen if it is determined that an eye gaze of the user is directed toward the preset screen using the received eye gaze information and a user gesture corresponding to the received gesture information is sensed.

According to another aspect of the present invention, a method of controlling a display apparatus is provided. The method includes receiving eye gaze information of a user and user gesture information from an external apparatus; and displaying a preset object on a screen of the display apparatus if it is determined that an eye gaze of the user is directed toward the screen using the received eye gaze information and a user gesture corresponding to the received user gesture information is sensed.

BRIEF DESCRIPTION OF THE DRAWINGS

The above and/or other aspects, features, and advantages of the present invention will be more apparent from the following description, taken in conjunction with the accompanying drawings, in which:

FIGS. 3 to 11 and FIGS. 17A to 27C are diagrams of interactions between a display apparatus and a user according to various embodiments of the present invention;

DETAILED DESCRIPTION OF EMBODIMENTS OF THE PRESENT INVENTION

Embodiments of the present invention may be modified. Accordingly, certain embodiments are illustrated in the accompanying drawings and are described in detail below. However, it should be understood that the present invention is not limited to a certain embodiment of the present invention, but includes all modifications, equivalents, and substitutions within the scope of the present invention as defined by the appended claims and their equivalents. In addition, well-known functions or constructions are not described in detail since they would obscure the invention with unnecessary detail.

The terms "first," "second," etc. may be used to describe diverse components, but the components are not intended to be limited by the terms. The terms are only used to distinguish one component from another.

The terms used in the present disclosure are only used to describe the embodiments of the present invention, but are not intended to limit the scope of the present invention. A singular expression also includes the plural meaning unless clearly defined otherwise in the present disclosure. In the present disclosure, the terms "include" and "consist of" designate the presence of features, numbers, steps, operations, components, elements, or a combination thereof that are described in the present disclosure, but do not exclude the presence or possibility of addition of one or more other features, numbers, steps, operations, components, elements, or a combination thereof.

In an embodiment of the present invention, the terms "module" and "unit" indicate an entity that performs at least one function or operation, and may be implemented in hardware, software, or a combination of hardware and software. In addition, a plurality of "modules" or a plurality of "units" may be integrated into at least one module except for a "module" or a "unit" which must be implemented with certain hardware, and may be implemented with at least one processor.

Figure 1:
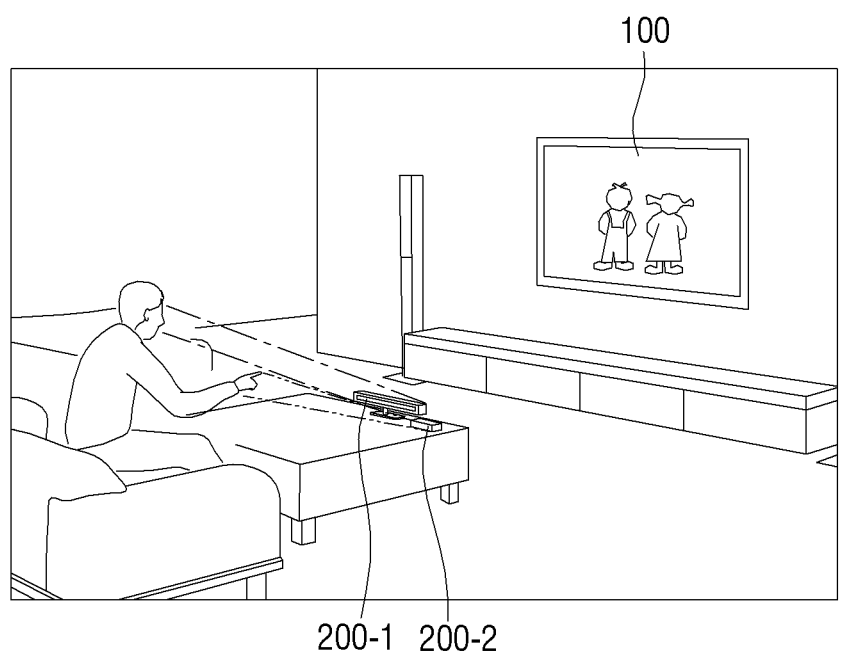
FIG. 1 is a diagram illustrating an interaction system according to an embodiment of the present invention.

FIG. 1 is a diagram illustrating an interaction system according to an embodiment of the present invention.

Referring to FIG. 1, an interaction system, which is referred to as an environment in which an interaction between a display apparatus and a user is performed, may include a display apparatus 100 and external apparatuses 200-1 and 200-2 for the display apparatus 100.

The display apparatus 100, which is an apparatus displaying an image, may be implemented by a television (TV) (e.g., a portable TV, a movable TV, a smart TV, or the like), a personal computer (PC) (e.g., a desktop PC, a notebook PC, or the like), a cellular phone, a smartphone, a digital camera, a portable projector, a digital frame, and the like, and may also be implemented by a home appliances such as an audio player, an air conditioner, or the like that includes a display unit.

The external apparatuses 200-1 and 200-2 may collect information concerning a user's body such as the face of a user, an eye gaze of a user, a gesture of a user, and the like by a photographing unit, an acceleration sensor, a gyro sensor, a gravity sensor, and the like, and may collect a voicing of a user by a microphone. The external apparatuses 200-1 and 200-2 may be connected to the display apparatus 100 in a wireless or wired scheme.

In this case, a gesture of the user has a meaning including both a stationary state and a dynamic state of a portion of a user's body.

The external apparatus 200-1 for collecting information related to an eye gaze of a user may be in a form of a stand device as illustrated in FIG. 1, or may be attached to the display apparatus 100 to be operated as one configuration of the display apparatus 100. For example, the external apparatus 200-1 for collecting the information related to an eye gaze of a user includes a photographing unit. The external apparatus 200-1 may transmit a photograph of a facial image of a user to the display apparatus 100. Alternatively, the external apparatus 200-1 may also be implemented to detect an eye gaze of a user directed toward a screen of the display apparatus 100 and transmit the detected result to the display apparatus 100.

In order to collect information related to an eye gaze of a user, by the external apparatus 200-1, a wearable device such as smart glasses may be used. The smart glasses may include a photographing unit for photographing a user's pupils and may transmit images of a user's pupils to the display apparatus 100. Alternatively, smart glasses may also be implemented to detect positions of pupils, directions of pupils, sizes of pupils, and the like, and transmit a detected result to the display apparatus 100.

In addition, the external apparatus 200-2 for collecting a gesture of a user may also be in a form of a stand device as illustrated in FIG. 1, and may be attached to the display apparatus 100 to be operated as one configuration of the display apparatus 100. For example, the external apparatus 200-2 for collecting a gesture of a user includes a photographing unit. The external apparatus 200-2 may transmit a photographed image of a portion of a user's body to the display apparatus 100. Alternatively, the external apparatus 200-2 may also be implemented to recognize a gesture of a user by analyzing a photographed image of a portion of a user's body and transmit the recognized result to the display apparatus 100.

A gesture of a user may include a stationary gesture and a dynamic gesture, wherein a stationary gesture may be determined based on a single frame of a photographed image and a dynamic gesture may be determined based on a plurality of frames of a photographed image.

Alternatively, a dynamic gesture may be collected by a wearable device such as a smart watch, and a stationary gesture may be collected by a separate photographing apparatus. For example, when a user moves while wearing a smart watch, the smart watch may convert a motion of the user into a data signal using an acceleration sensor, a gravity sensor, a gyro sensor, and the like, and transmit the converted data to the display apparatus 100.

In addition, at least one of the external apparatuses 200-1 and 200-2 may include a microphone to collect a voicing of a user, such that voicing information may be transmitted to the display apparatus 100, a meaning of the voicing of the user may be identified, or the identified result may be transmitted to the display apparatus 100.

As described above, the external apparatuses 200-1 and 200-2 may be implemented in various forms, and are not limited to the examples described above. In addition, although a case in which there is a plurality of external apparatuses has been described above, the external apparatuses 200-1 and 200-2 may also be implemented as a single apparatus capable of performing all of a plurality of functions. In addition, the display apparatus 100 may also be implemented to perform the functions of the external apparatuses 200-1 and 200-2 described above, and in this case, a separate external apparatus is not required.

In addition, the display apparatus 100 may receive information related to an eye gaze of a user, gesture information of a user, or voicing information of a user from the external apparatuses 200-1 and 200-2 as described above to perform a command intended by a user. A detailed interaction between a user and the display apparatus 100 is described below in greater detail.

Figure 2:
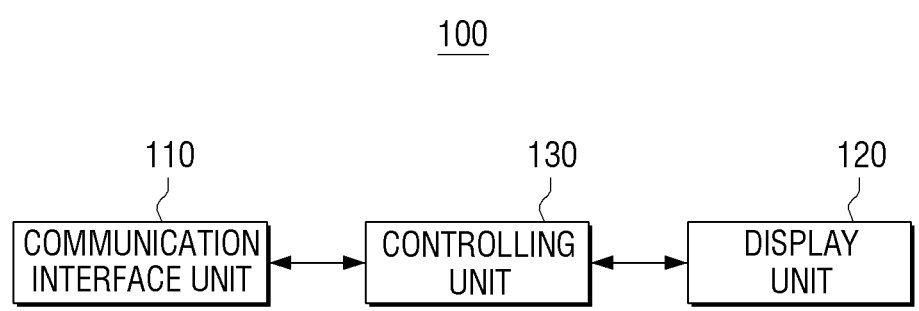
FIG. 2 is a block diagram of a display apparatus according to an embodiment of the present invention.

FIG. 2 is a block diagram of the display apparatus 100 according to an embodiment of the present invention.

Referring to FIG. 2, the display apparatus 100 includes a communication interface unit 110, a display unit 120, and a controlling unit 130.

The communication interface unit 110 is a component for performing communication with various external apparatuses.

For example, the communication interface unit 110 may include various communication integrated circuits or chips such as a wireless fidelity (WiFi) chip, a Bluetooth chip, a near field communication (NFC) chip, a wireless communication chip, an infrared (IR) chip, and the like. In this case, the WiFi chip, the Bluetooth chip, the NFC chip, and the IR chip perform communication in a WiFi mode, a Bluetooth mode, an NFC mode, and an IR mode, respectively. Among these chips, the NFC chip indicates a chip which is operated in the NFC mode using a frequency band of 13.56 MHz of various radio frequency identification (RF-ID) frequency bands such as 135 kHz, 13.56 MHz, 433 MHz, 860 to 960 MHz, 2.45 GHz, and the like. In the case in which the WiFi chip or the Bluetooth chip is used, the WiFi chip or the Bluetooth chip may first transmit and receive a variety of access information such as a service set identifier (SSID), a session key, and the like, perform a communication connection using the variety of access information, and then transmit and receive a variety of information. The wireless communication chip indicates a chip performing communication according to various communication standards such as Institute of Electrical and Electronics Engineers (IEEE), ZigBee, 3rd generation (3G), 3rd generation partnership project (3GPP), long term evolution (LTE), and the like.

For example, the communication interface unit 110 may receive facial information of a user, voicing information of a user, eye gaze information of a user, and gesture information of the a from the external apparatuses 200-1 and 200-2.

The display unit 120 is a component for displaying a preset screen according to a control of the controlling unit 130. For example, the display unit 120 may display various image data and/or objects.

The controlling unit 130, which is a component for controlling an overall operation of the display apparatus 100, may interpret a command intended by a user from information received from the external apparatuses 200-1 and 200-2 to perform an operation corresponding to the command. For example, the controlling unit 130 may enter an interaction mode in various schemes.

The interaction mode indicates a state in which the display apparatus 100 may be controlled using a gesture of a user or a voicing of a user together with an eye gaze of the user as an input. If the controlling unit 130 enters the interaction mode, objects associated with a control of the display apparatus 100 are displayed on a screen of the display unit 120 to guide an eye gaze of a user. In addition, the controlling unit 130 may detect an eye gaze of a user and determine whether the detected eye gaze of the user is directed toward an object displayed on the screen.

In a method of detecting an eye gaze of a user according to an embodiment of the present invention, the following steps may be performed. First, the controlling unit 130 may detect an eye image from a facial image of a user included in the information received from the external apparatus 200-1, obtain positions of pupils from the detected eye image, and detect the eye gaze of the user toward a screen.

As an example of entering the interaction mode, the controlling unit 130 may enter the interaction mode by determining that an eye gaze of a user is directed toward a screen of the display apparatus 100 using eye gaze information received from the external apparatus 200-1 and controlling the display unit 120 so that the preset object is displayed on the screen when a user gesture corresponding to the gesture information received from the external apparatus 200-2 is sensed.

That is, in the case in which a first condition in which an eye gaze of a user is directed toward a screen and a second condition in which a user gesture is sensed are all satisfied, the controlling unit 130 detects that the user intends to interact with the display apparatus 100 and enters the interaction mode. "Sensing" of a user gesture for entering the interaction mode mentioned herein does not indicate "recognizing" a specific gesture. In other words, if an existence of a portion of a user's body is sensed while an eye gaze of the user is directed toward a screen, the controlling unit 130 may enter the interaction mode. As another example, if a frown on a user's face is sensed or a mouth gape is sensed while an eye gaze of the user is directed toward a screen, the controlling unit 130 may enter the interaction mode.

As such, the controlling unit 130 may enter the interaction mode by various user gestures sensed while eye gaze of the user is directed toward a screen.

In a method of recognizing a user's gesture in an embodiment of the present invention, the following steps may be performed. First, the controlling unit 130 obtains an image of a user's body by removing a background region from an image included in gesture information received from the external apparatus 200-2, extracts a face, an arm, a hand, a torso, a leg, or a foot region of the user from the obtained image of the user's body using edge and color information, recognizes a gesture made by the user by extracting characteristic points from the extracted face, arm, hand, torso, leg, or foot, searches for a gesture that matches the recognized gesture among gestures stored in a storing unit, and identifies a command corresponding to the matched gesture.

In addition, as another example of entering the interaction mode, even in a case in which a voicing of a user is sensed while an eye gaze of the user is directed toward a screen, the controlling unit 130 may enter the interaction mode by displaying a preset object on the display unit 120. In this case, the voicing of the user may be a pre-designated voicing, for example, a voicing such as "ah," which may be devoid of meaning. Alternatively, the voicing of the user may also include a clap sound made by the user.

In this case, the controlling unit 130 may enter the interaction mode according to various inputs such as an input image or voicing together with an eye gaze of a user. Hereinafter, only an embodiment of the present invention in which a user uses a portion of the user's body in order to enter the interaction mode is described.

Figure 3:
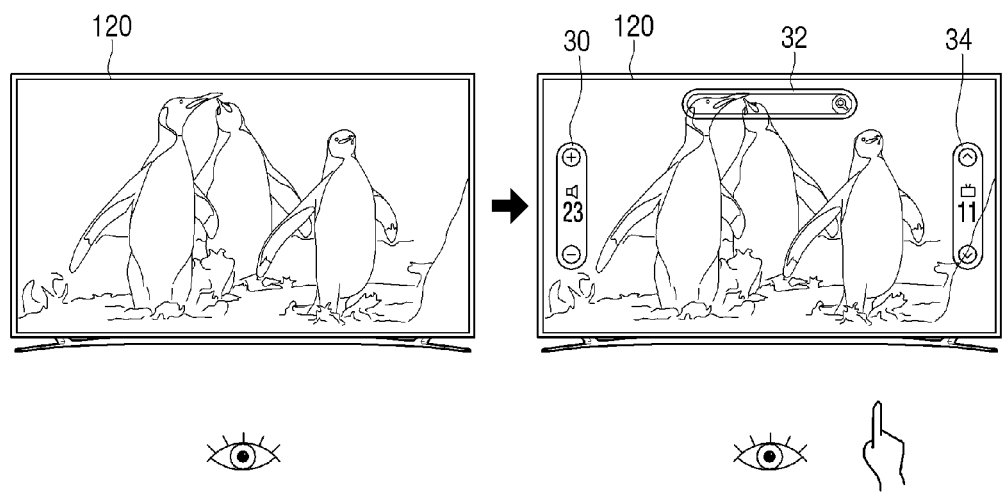
Figure 4:
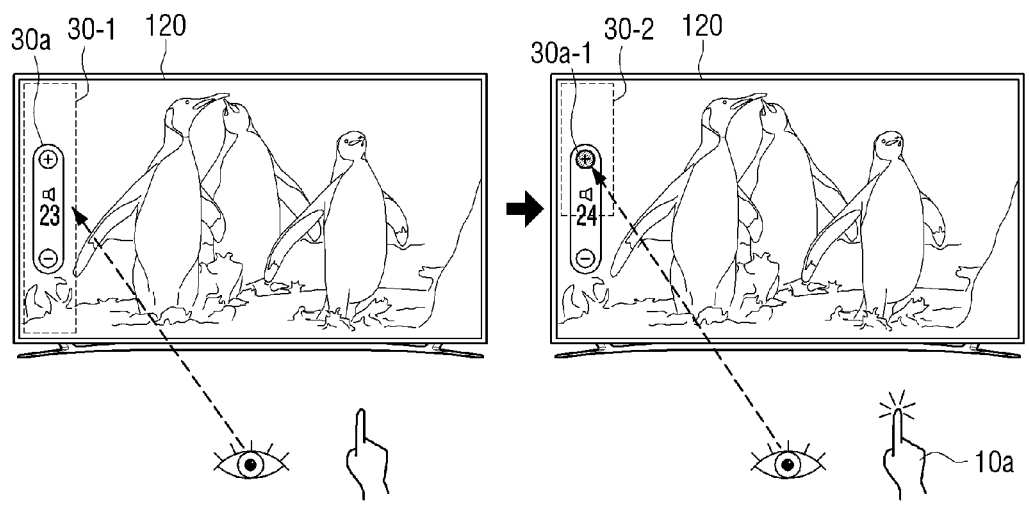

FIGS. 3 and 4 are diagrams illustrating a method of entering the interaction mode and displaying various objects in the interaction mode, according to an embodiment of the present invention.

Referring to FIG. 3, for example, in the case in which a portion (e.g., a finger) of the body of a user is sensed while an eye gaze of the user is directed toward a screen, the controlling unit 130 may enter the interaction mode and display objects 30, 32, and 34. The object 30 is an object for controlling volume, the object 34 is an object for selecting a channel, and the object 32 is an object for activating a search box. In this case, the objects 30, 32, and 34 may be transparently displayed so as to represent a non-selectable state (e.g. a deactivation state).

Then, referring to FIG. 4, if it is determined that the eye gaze of the user is directed toward a region 30-1 in which the object 30 for controlling volume is displayed, the controlling unit 130 may control the display unit 120 so that the object 30 for controlling the volume corresponding to the eye gaze of the user is varied and displayed. For example, the controlling unit may vary the object 30 to an opaque object 30a so as to represent a selectable state (e.g. an activation state) and display the opaque object 30a, enlarge the size of the object 30, or form an edge on the object 30. In this case, the remaining objects 32 and 34 toward which the eye gaze of the user is not directed may no longer be displayed on the display unit 120, or may maintain a display state as is. That is, only the object on which the eye gaze of the user is directed toward is varied and displayed.

Referring to FIG. 4, if it is determined that the eye gaze of the user is directed to a region including an object 30a-1 of increasing the volume, the controlling unit 130 may vary (e.g., highlight) the object 30a-1 for increasing the volume and display the varied object 30a-1 on the display unit 120.

In this state, if a preset gesture is recognized, for example, a gesture 10a in which the user taps with the finger is sensed, which is an event corresponding to the object 30a-1 for increasing the volume and the preset gesture, the controlling unit 130 increases the volume.

If at least one of the gesture of the user and the eye gaze of the user directed toward the screen is not recognized for a preset time after the objects are displayed, the controlling unit 130 may control the display unit 120 so that the display of the objects is terminated.

As described above, the controlling unit 130 may control the display unit 120 so that in the case in which an intention of the user is present, an object (e.g. a guide object) in the deactivation state for guiding the eye gaze is displayed, and in the case in which the eye gaze of the user is directed toward a certain object is detected, the object corresponding to the eye gaze is displayed differently from other objects or only the object corresponding to the eye gaze is displayed.

In addition, although the embodiment of the present invention described above concerns the case in which a certain event is performed only in the case in which a preset gesture is recognized in a state in which an eye gaze of a user is fixed to a certain object, it is difficult to fix an eye gaze of a user to one point for very long. Thus, according to an embodiment of the present invention, even though an eye gaze of a user is displaced to another point while being directed toward a certain object, a selection state of the certain object may be maintained. An embodiment of the present invention is described below in greater detail.

Figure 5:
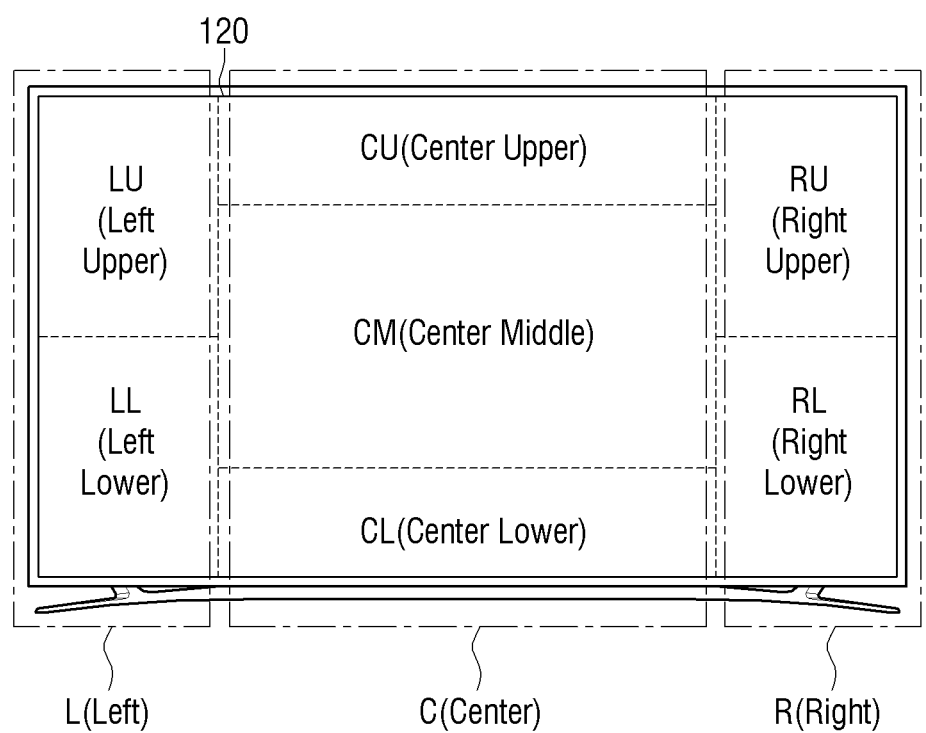

FIG. 5 is a diagram of an interaction between the display apparatus 100 and a user according to an embodiment of the present invention.

Referring to FIG. 5, regions configuring a screen of the display unit 120 are partitioned as illustrated in FIG. 5. For example, as illustrated in FIG. 5, the screen of the display unit 120 may be partitioned into a plurality of regions, and when each of the regions on the screen is designated, abbreviations such as left upper (LU), left lower (LL), and the like, are used. However, this is merely an example, and the present invention is limited thereto.

According to an embodiment of the present invention, the controlling unit 130 may vary an object corresponding to an eye gaze of a user and display the varied object. For example, the controlling unit 130 may highlight an object corresponding to an eye gaze of a user and display the highlighted object or display the object in a larger size. In addition, in a state in which a display of a varied object is maintained, if it is determined that an eye gaze of a user is not directed toward the object displayed on the screen and a preset user gesture is recognized, the controlling unit 130 performs an event corresponding to the varied and displayed object and the preset user gesture. A detailed example thereof is described below with reference to FIG. 6.

Figure 6:
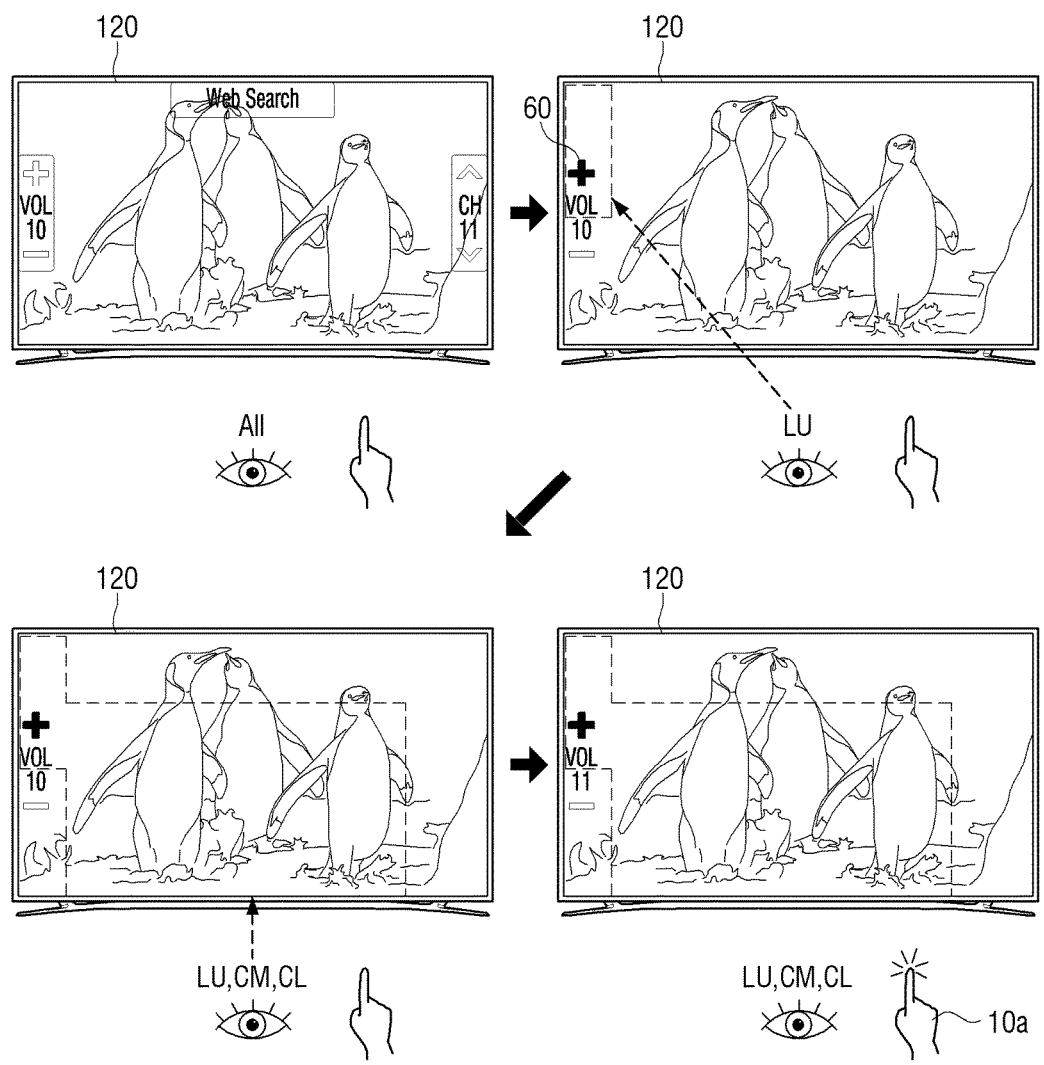

FIG. 6 is a diagram of an interaction between the display apparatus 100 and a user according to an embodiment of the present invention.

Referring to FIG. 6, objects are positioned in an LU region, an LL region, a CU region, an RU region, and an RL region on the display unit 120. If it is determined that an eye gaze of a user is directed toward the LU region, the controlling unit 130 controls the display unit 120 so that an object 60 included in the LU region is highlighted and displayed. Thereafter, if it is determined that the eye gaze of the user is not directed toward any object displayed on the screen, that is, if it is determined that the eye gaze of the user is directed toward a region CM or CL in which no objects are displayed, even though the eye gaze of the user is not directed toward the object 60, the highlighted state of the object 60 is maintained. If a user gesture 10*a* is sensed in this state, the controlling unit 130 performs a function corresponding to the object 60 and the user gesture 10*a*. In this case, volume is increased.

According to an embodiment of the present invention, a user may conveniently interact with the display apparatus 100 even though an eye gaze of the user is not continuously directed toward a certain object.

Figure 7:
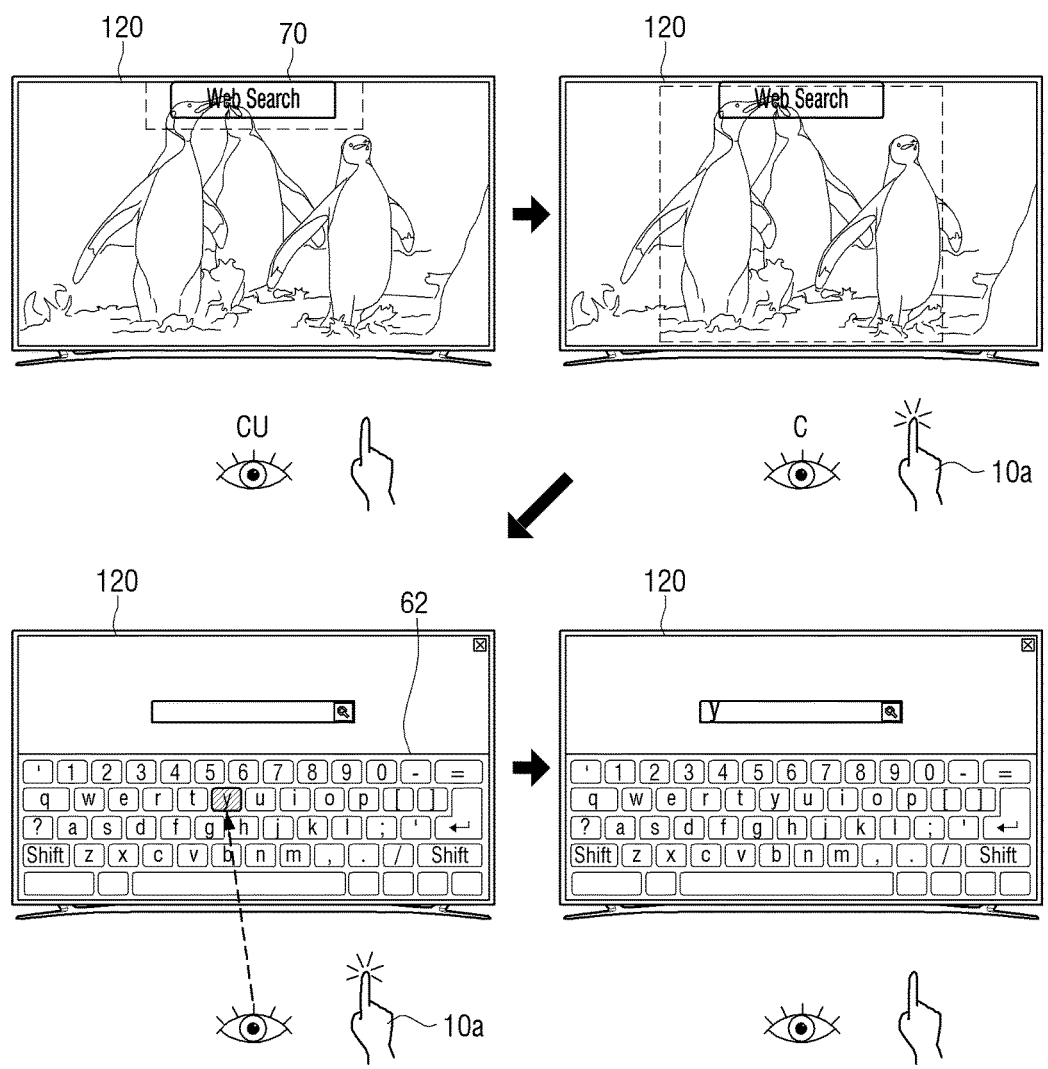

FIG. 7 is a diagram illustrating a user interaction for inputting a text according to an embodiment of the present invention.

Referring to FIG. 7, if it is determined that an eye gaze of a user is directed toward the CU region, the controlling unit 130 controls the display unit 120 so that an object 70 included in the CU region is highlighted and displayed. Thereafter, even though the eye gaze of the user is not directed toward the object 70, if the eye gaze of the user is present in any region that includes the letter "C" (e.g. a C region), the highlighted state of the object 70 may be continued. If the eye gaze of the user is positioned in the C region and the user gesture 10*a* is sensed in this state, the controlling unit 130 performs a function corresponding to the object 70 and the user gesture 10*a*. In this case, as illustrated in FIG. 7, a web search screen is displayed while a web search function is executed, and a keyboard object 62 is displayed.

A scheme for inputting text using an eye gaze of the user is described below. Referring to FIG. 7, if the user gazes at a character on the keyboard to be input and makes the preset gesture 10*a*, the character on the keyboard corresponding to the eye gaze of the user is selected. In this case, "y" is selected and input.

Hereinafter, forms of various objects in an interaction mode are described below.

FIGS. 8 to 10B are diagrams illustrating objects and user gestures in an interaction mode according to various embodiments of the present invention.

Figure 8:
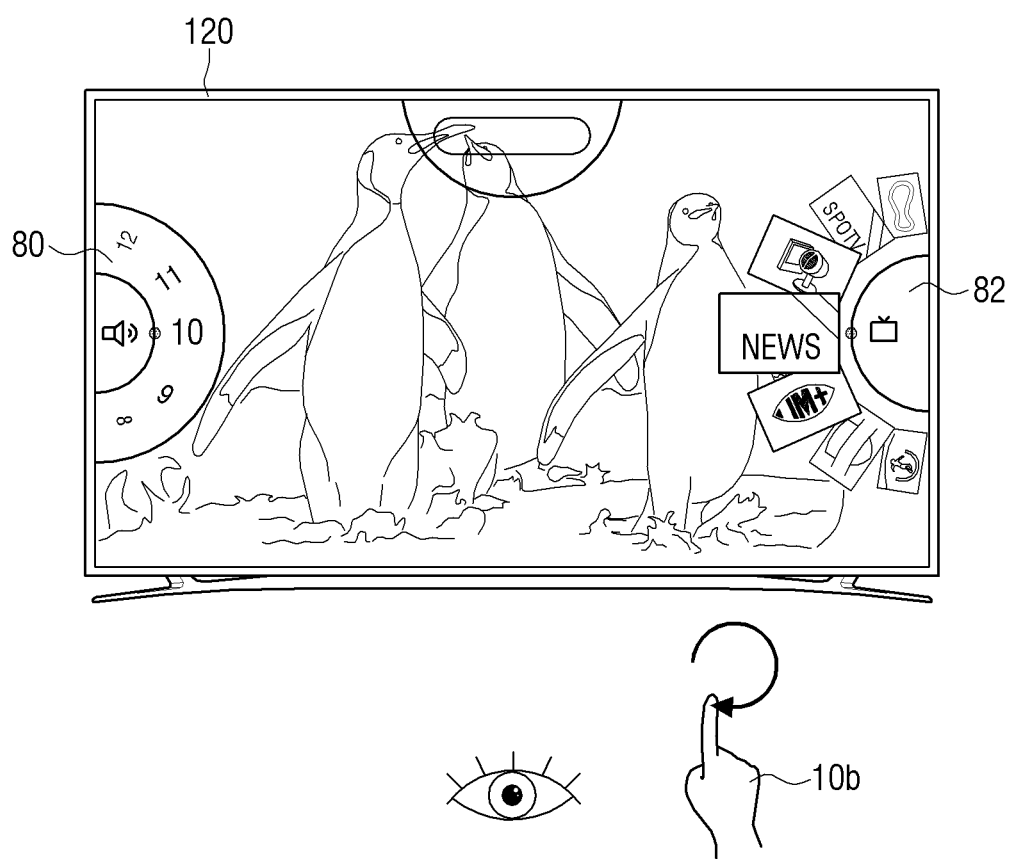

Referring to FIG. 8, if the controlling unit 130 enters the interaction mode, the controlling unit 130 may control the display unit 120 so that objects 80 and 82 each in a form of a wheel are displayed. In addition, if a gesture 10*b* of turning a finger in a clockwise direction or a counterclockwise direction is sensed, the object of the wheel corresponding to an eye gaze of a user is rotated in the rotation direction of the finger. For example, the user may execute a volume selection or a channel selection by stopping the finger rotation at a desired point.

Figure 9:
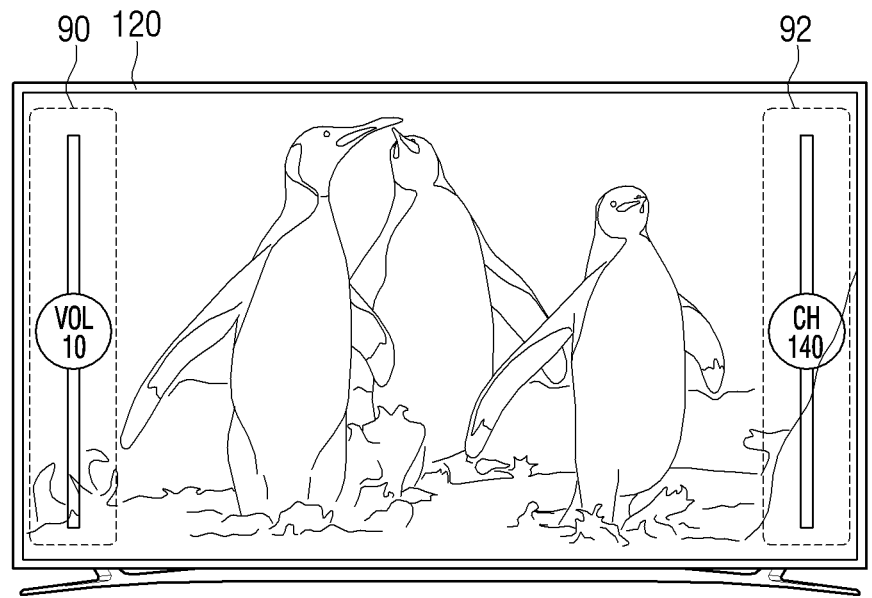
Figure 9:
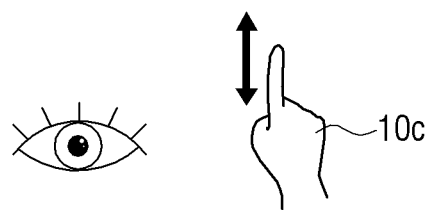

Referring to FIG. 9, if the controlling unit 130 enters the interaction mode, the controlling unit 130 may control the display unit 120 so that objects 90 and 92 each in the form of a bar are displayed. In addition, if a gesture 10*c* of moving a finger up or down is sensed, the object of the bar corresponding to an eye gaze of the user is moved according to the movement of the finger. In this case, a gesture of moving the finger up may be, for example, a gesture in which the finger is moved up and is then maintained, or a gesture repeating an operation of moving the finger from down to up. A gesture of moving the finger down may be, for example, a gesture in which the finger is moved down and is then maintained, or a gesture repeating an operation of moving the finger from up to down.

Figure 10A:
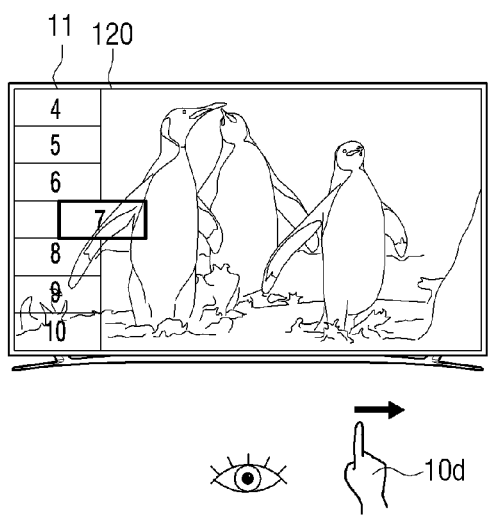
Figure 10B:
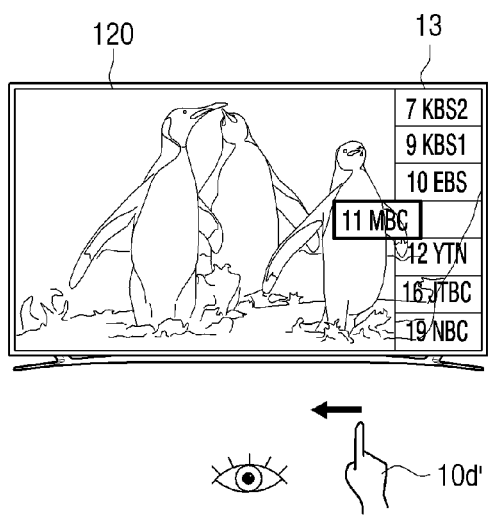

Referring to FIGS. 10A and 10B, if the controlling unit 130 enters the interaction mode, the controlling unit 130 may control the display unit 120 so that objects 11 and 13 each in the form of stacked bricks are displayed. In addition, in FIG. 10A, with respect to a volume object 11, if a gesture of pulling out one brick by a finger, that is, a gesture 10*d* in which the finger is moved from the left to the center of the screen, is sensed, the controlling unit 130 may change the volume of the display apparatus 100 to that of the volume corresponding to the pulled out brick. In addition, in FIG. 10B, with respect to a channel object 13, if a gesture 10*d'* in which the finger is moved from the right to the center of the screen is sensed, the controlling unit 130 may control the display apparatus 100 so that a movement to the channel corresponding to the pulled out brick is executed.

Figure 11:
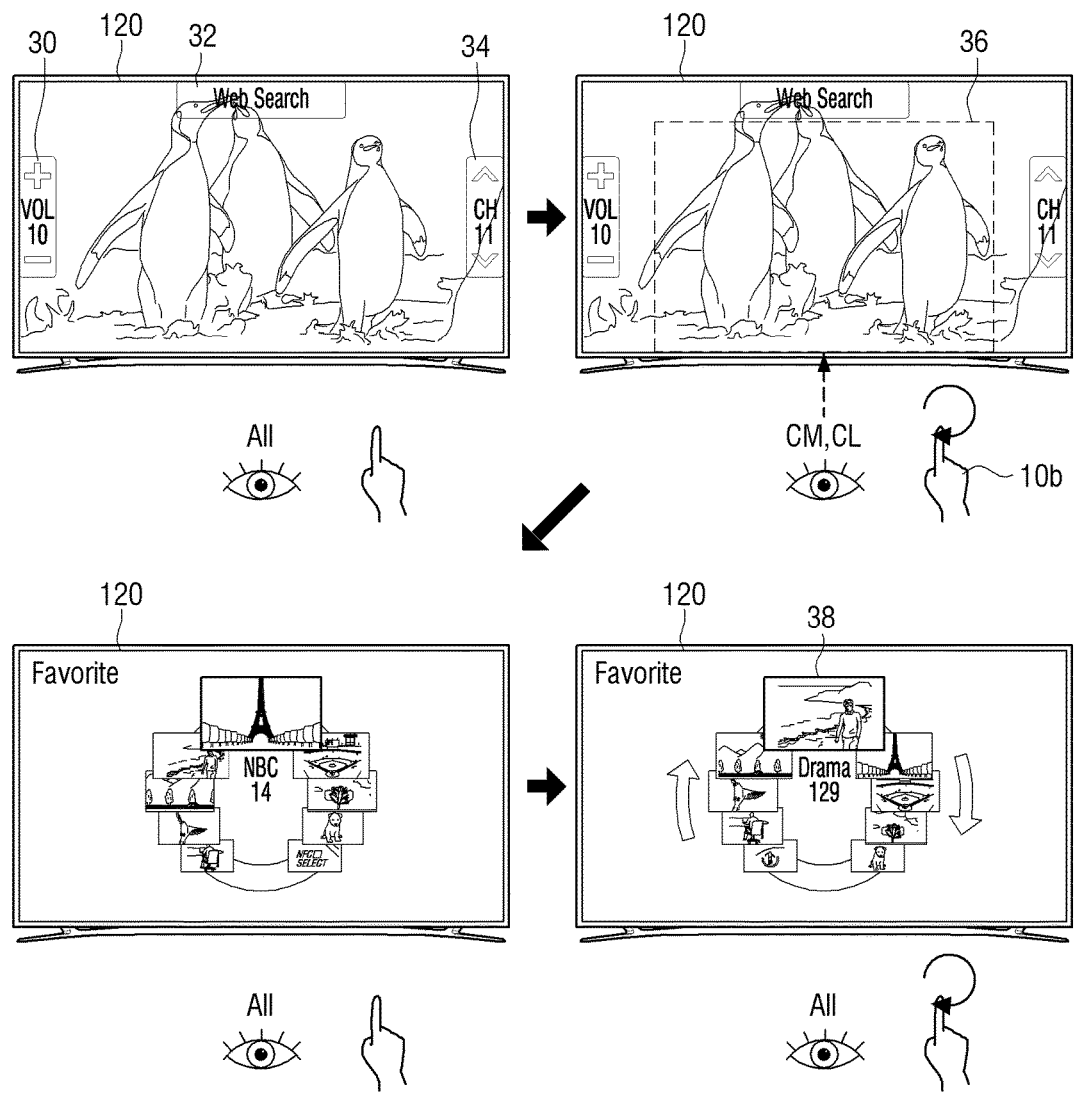
Figure 12A:
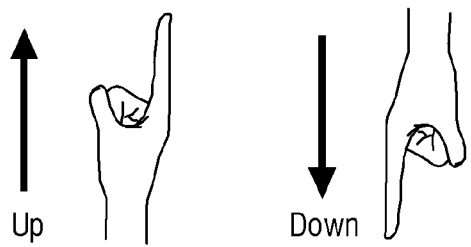
FIGS. 12A to 16B are diagrams illustrating various gestures for controlling a display apparatus according to various embodiments of the present invention.
Figure 12B:
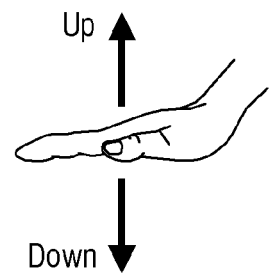
Figure 12C:
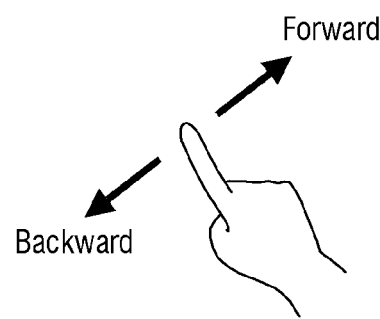
Figure 12D:
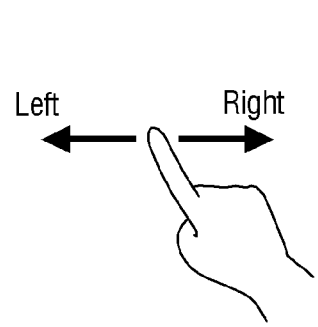
Figure 12E:
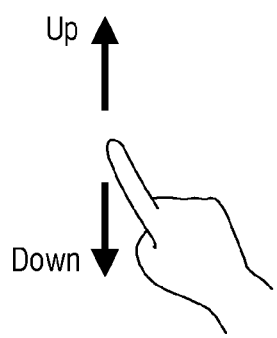
Figure 12F:
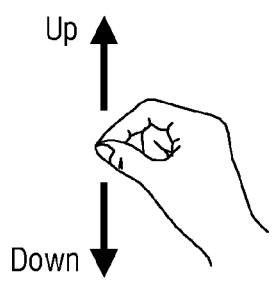

FIG. 11 is a diagram illustrating an example of executing a certain function according to a user's gesture.

Referring to FIG. 11, if it is determined that an eye gaze of a user is directed toward a screen and a user gesture is sensed, the controlling unit 130 displays objects 30, 32, and 34 corresponding to controllable functions on an output screen. Additionally, a guide object 36 informing that an interaction for the center CM and CL of the screen is possible may be displayed. In addition, if it is determined that the eye gaze of the user is directed toward the center CM and CL of the screen and a preset gesture is sensed, for example, if the gesture 10*b* of turning a finger as illustrated in FIG. 11 is sensed, the controlling unit 130 performs an event corresponding to the center region of the screen and the sensed gesture. For example, as illustrated in FIG. 11, a list of favorite channels may be displayed. In addition, thumbnails corresponding to channels may be sequentially displayed along the direction in which the gesture 10*b* is turning the finger, and thereafter, if a gesture in which the user taps with the finger is sensed, the uppermost thumbnail 38 among the list is selected, such that a movement to the corresponding channel may be performed.

The case in which a list of favorite channels is displayed is merely an example, and a user may arbitrarily set frequently used functions at the center region of the screen. That is, in the interaction mode, not only predetermined functions such as volume control, channel selection, and the like may be used, but also functions which are arbitrarily set by the user.

In addition, according to various embodiments of the present invention, various gestures may be used in addition to the gestures described above. The gestures may be classified into categories of directivity, selectivity, operability, formability, and continuity, where some examples of the respective categories are described below.

For a gesture representing directivity, various gestures illustrated in FIGS. 12A to 12F may be used. These gestures may be used for volume control or channel selection.

Figure 13A:
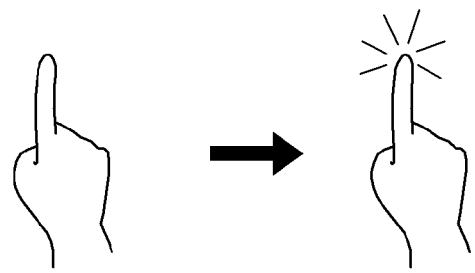
Figure 13B:
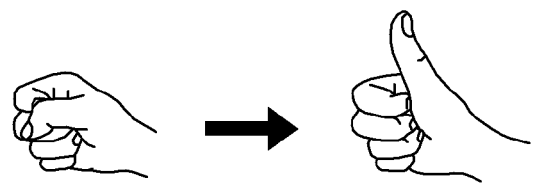
Figure 13C:
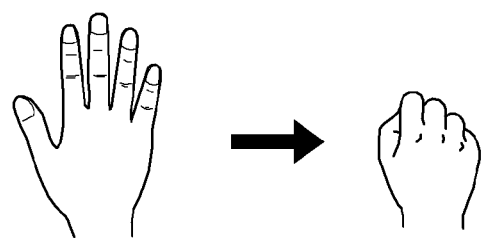
Figure 17A:
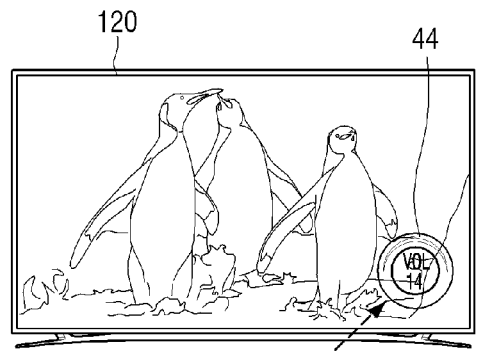

For a gesture representing selectivity, various gestures as illustrated in FIGS. 13A to 13C may be used. These gestures may be used for selecting an object. The gesture of FIG. 13A is a tapping gesture with a finger, the gesture of FIG. 13B is a gesture of clenching a fist and then lifting a thumb, and the gesture of FIG. 13C is a gesture of opening and closing a hand. In addition, a gesture of picking up an object may be used for selecting an object. This is illustrated in FIG. 17C. Referring to FIG. 17C, the controlling unit 130 may control the display unit 120 so that images representative of the channels are arranged and displayed, and if a gesture 10n of picking up any one of the images is recognized, the controlling unit 130 may control the display apparatus 100 so that the movement to the corresponding channel is performed.

Figure 14A:
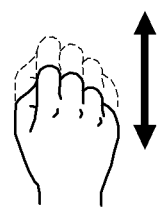
Figure 14B:
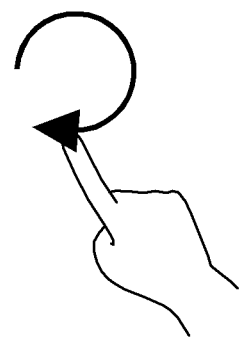
Figure 14C:

For a gesture representing operability, various gestures as illustrated in FIGS. 14A to 14C may be used. The gesture of FIG. 14A, which is a gesture of clenching and releasing a fist, may be used to rotate a wheel object, for example. The gesture of FIG. 14B, which is a gesture of rotating a finger, may be used to rotate the wheel object. Alternatively, the gesture of FIG. 14B may be used to execute a function mapped to the center region of the screen as described above. The gesture of FIG. 14C is a gesture of grabbing and twisting an object. An example of using the gesture of FIG. 14C is illustrated in FIG. 17A.

Figure 15A:
Figure 15B:
Figure 15C:
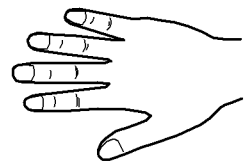

For a gesture representing formability, various gestures as illustrated in FIGS. 15A to 15C may be used. For example, a certain function may be immediately executed by the gestures representing formability. For example, if a gesture such as the gesture of FIG. 15A is recognized, the controlling unit 130 may control the display apparatus 100 so that a movement to a certain channel is immediately performed. If a gesture such as the gesture of FIG. 15B is recognized, the controlling unit 130 may control the display apparatus 100 so that muting is performed. In addition, if a gesture such as the gesture of FIG. 15C is recognized, the controlling unit 130 may control the display unit 120 so that a main menu is displayed.

Figure 16A:
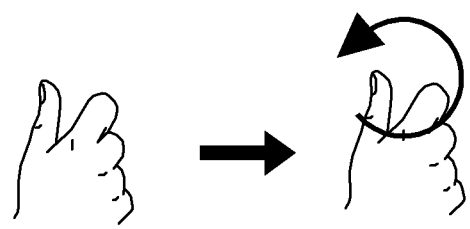
Figure 16B:
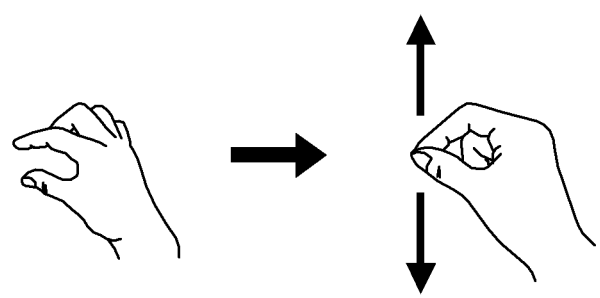

For a gesture representing continuity, various gestures as illustrated in FIGS. 16A and 16B may be used. If the gestures representing continuity are recognized, the controlling unit 130 may perform a continuous event. For example, if a gesture of grabbing and turning an object and then maintaining a state thereof such as the gesture of FIG. 16A is recognized, the controlling unit 130 may continuously perform an event corresponding to an object toward which an eye gaze of a user is directed. For example, if the event is a volume adjustment event, the controlling unit 130 may continuously increase the volume step by step. The gesture of FIG. 16B is a gesture of picking up an object using an index finger and a thumb and then pulling an object down or pulling an object up. For example, if a user forms an index finger as in the gesture of FIG. 16B, pulls down an object, and maintains a state thereof while an eye gaze of the user is directed toward an object for volume control, the controlling unit 130 may control the display apparatus 100 so that the volume is continuously decreased step by step.

FIGS. 17A to 18C are diagrams illustrating the utilization of gestures described above.

Referring to FIG. 17A, the controlling unit 130 may control the display unit 120 so that a knob object 44 is displayed in the interaction mode, and if a gesture 10e of forming a hand in a chela shape and turning the hand is recognized, the volume control mapped to the knob object 44 may be performed.

Figure 17B:
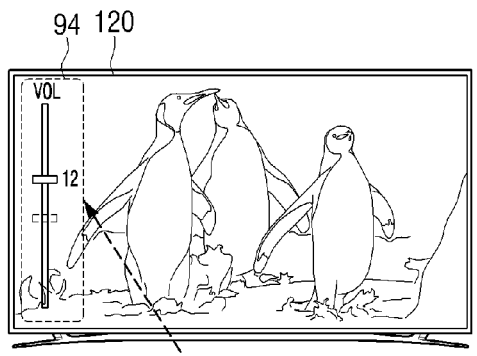
Figure 17C:
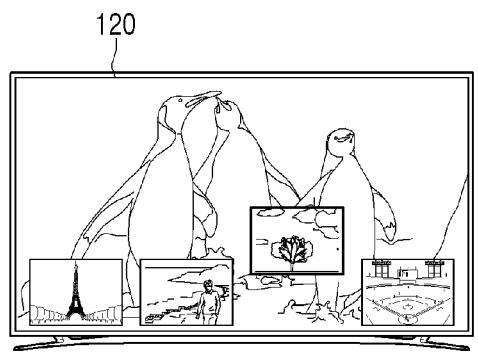

Referring to FIG. 17B, if it is determined that an eye gaze of a user is directed toward a volume control object 94 and a gesture 10f of moving a hand up and down in a state in which a palm is down is recognized, the volume control may be performed along a movement direction of the hand.

Referring to FIG. 17C, the controlling unit 130 may control the display unit 120 so that images representative of the channels in the interaction mode are enumerated and displayed and the images are sequentially displayed according to a user's gesture. In this case, if the gesture 10n of picking up an object is recognized, the controlling unit 130 may control the display apparatus 100 so that a movement to a channel corresponding to an image positioned at a position to which an eye gaze of the user is directed is performed.

Figure 18A:
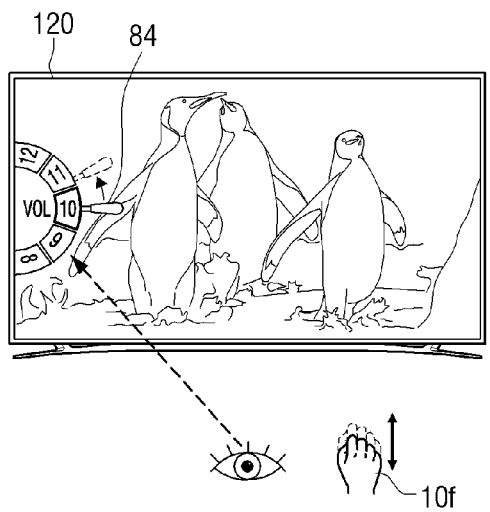

Referring to FIG. 18A, the controlling unit 130 may control the display unit 120 so that a lever object 84 is displayed in the interaction mode, and if a gesture 10f of pulling a lever is recognized, the volume control mapped to the lever object 84 may be performed according to a pulling direction. For example, if the lever is pulled all at once, the volume is increased one by one, and if the lever is pulled once and is then maintained, the volume is sequentially increased.

Figure 18B:
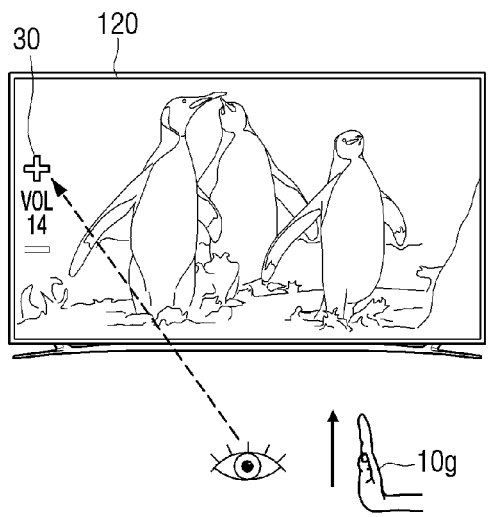

Referring to FIG. 18B, if it is determined that an eye gaze of a user is directed toward an object 30 for controlling volume and a gesture 10g of folding a wrist and raising the hand above is recognized, the controlling unit 130 sequentially increases the volume while the above-mentioned gesture is maintained.

Figure 18C:
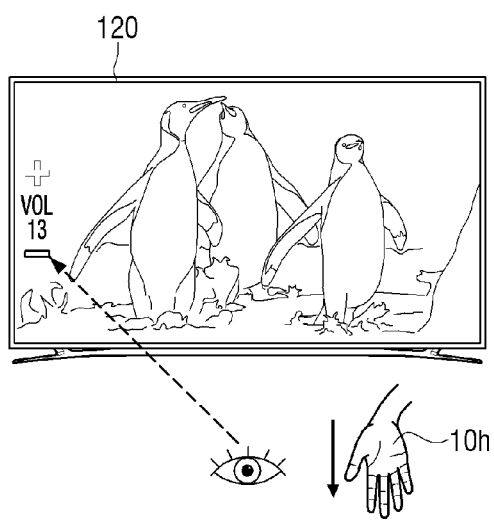

Referring to FIG. 18C, if it is determined that an eye gaze of a user is directed toward the object 30 for controlling the volume and a gesture 10h of folding the wrist and lowering the hand down is recognized, the controlling unit 130 sequentially decreases the volume while the above-mentioned gesture is maintained.

In addition, positions on which the objects are displayed may also be arbitrarily designated by a user. A description thereof is provided below with reference to FIGS. 19 and 20.

Figure 19:
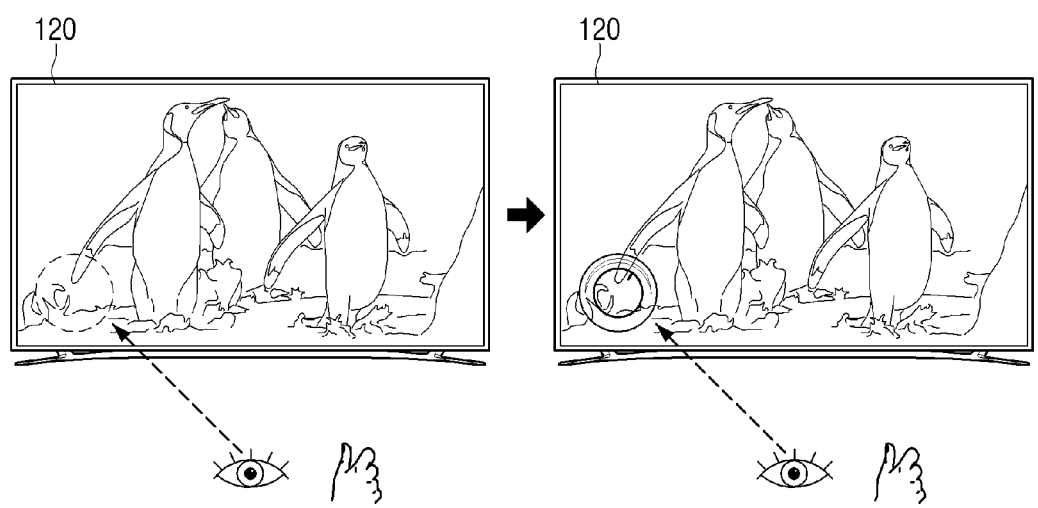

Referring to FIG. 19, an object may be disposed at a position at which an eye gaze of a user is directed toward. For example, if it is determined that the eye gaze of the user is directed toward the screen and the user gesture is recognized, the controlling unit 130 controls the display unit 120 so that the eye gaze of the user on the screen is detected and the object is displayed at a position toward which the eye gaze is directed. Thereafter, if the user makes a preset gesture while directing an eye gaze toward the object, the controlling unit 130 executes an event corresponding to the object and the gesture made by the user by recognizing the preset gesture.

In addition, various forms of objects may be displayed on a position at which an eye gaze of a user is directed.

Figure 20:
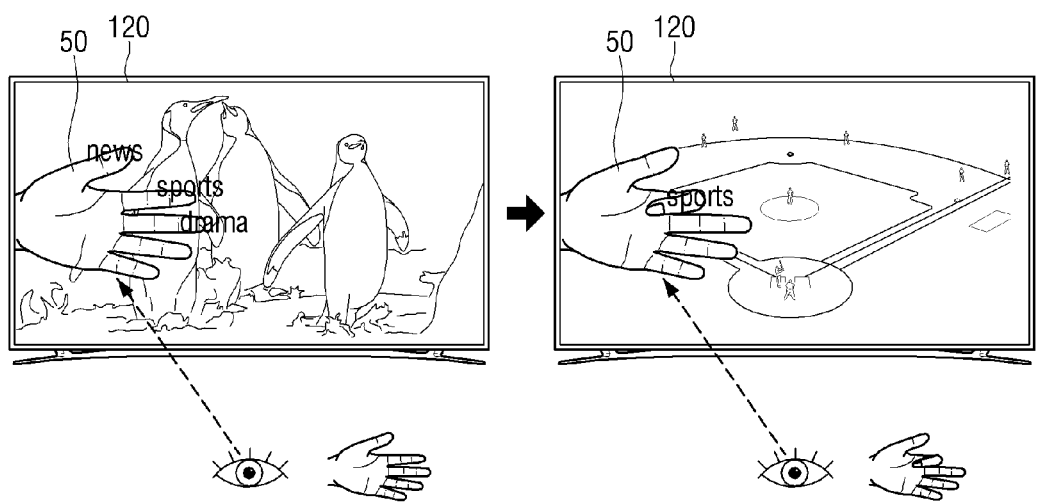

Referring to FIG. 20, the controlling unit 130 controls the display unit 120 so that a guide object 50 of a hand shape is displayed on a position to which an eye gaze of a user is directed and text indicating executable functions is displayed on each of the fingers. Thereafter, for example, if a user gesture of folding an index finger is recognized, the controlling unit 130 may control the display apparatus 100 so that a movement to any one of the channels broadcasting sports is performed, or may control the display apparatus 100 so that a list including all channels broadcasting sports is displayed. That is, the sports mode may be executed.

In addition, instead of using an eye gaze of the user, a display position of an object may also be determined by a user gesture indicating a certain direction of the screen.

Figure 21:
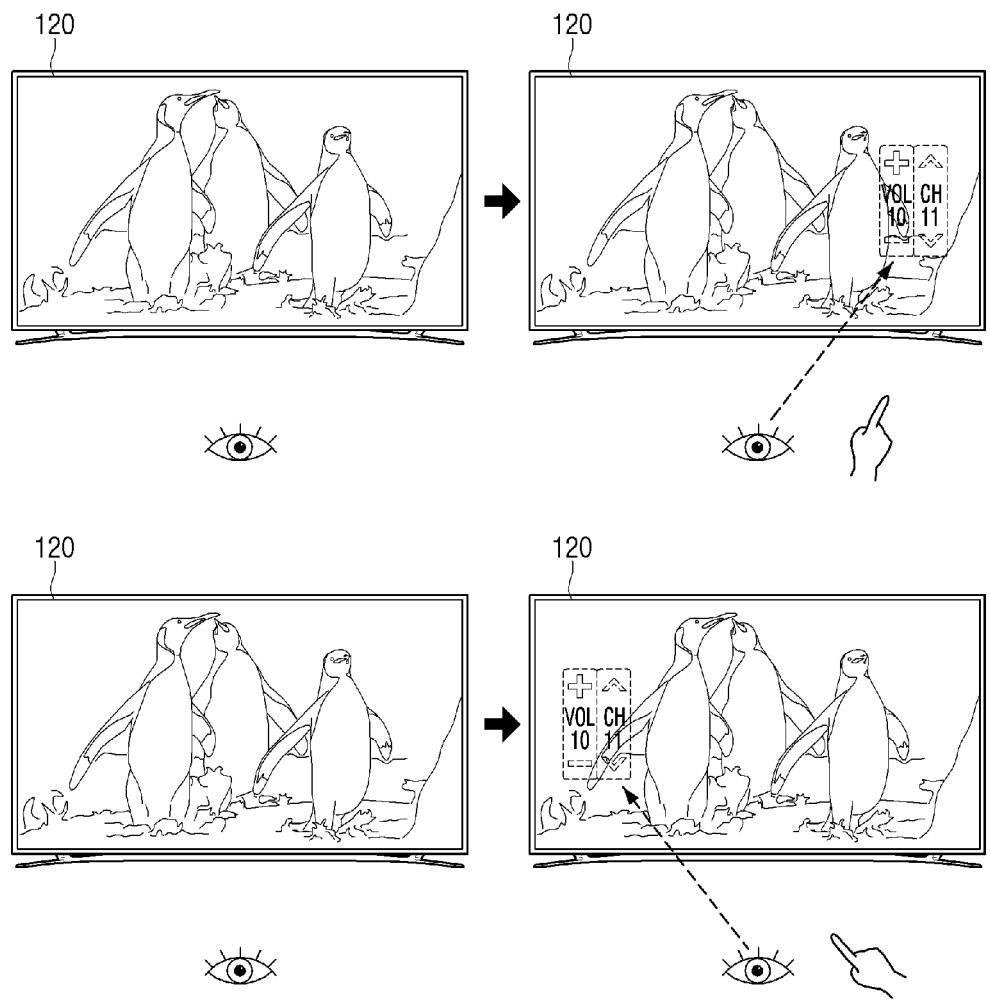

Referring to FIG. 21, if it is determined that an eye gaze of a user is directed toward the screen and a gesture indicating a certain direction of the screen is sensed, the controlling unit 130 may control the display unit 120 so that the object is displayed in the corresponding direction.

According to embodiments of the present invention described in FIGS. 19 to 21, an intention of a user that does not wish to cover a certain region of the screen may be satisfied.

Figure 22:
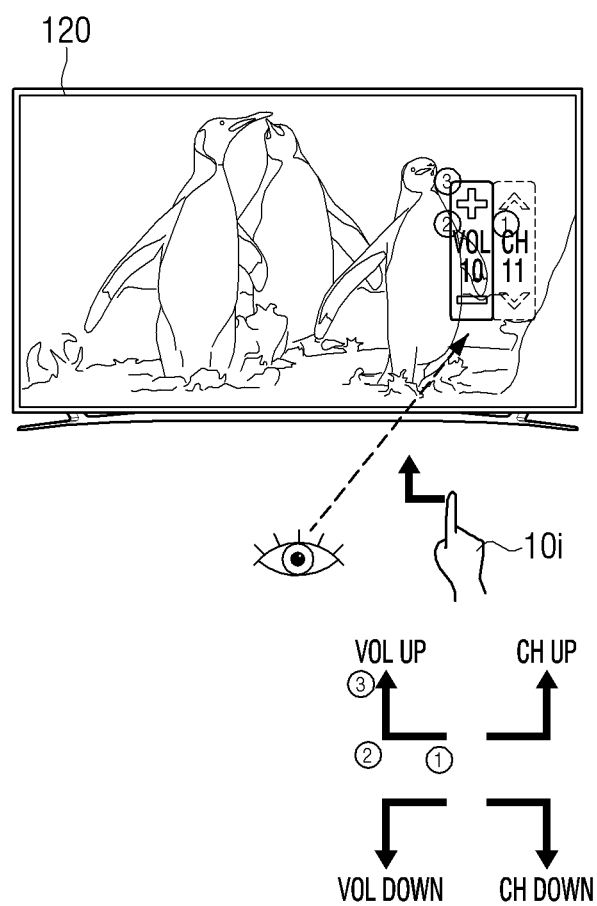

In addition, in the case in which objects performing separate functions are disposed to be adjacent to each other as illustrated in FIG. 21, accuracy of an eye gaze of the user may be degraded. In this case, according to an embodiment of the present invention, as illustrated in FIG. 22, the user makes a gesture from right (①) to left (②) and from down (②) to up (③), while an eye gaze is directed toward the objects, and the volume may be increased. According to an embodiment of the present invention, the user may execute a function as a gesture like the user drawing a trajectory along points with a fingertip, and after the user is adept at this gesture, the user may also more quickly execute the function than using the gestures described above.

In addition, the user may also execute a desired function by making a gesture of drawing characters such as figures or an alphabet in the air with a hand. A detailed illustration thereof is described below with reference to FIG. 23.

Figure 23:
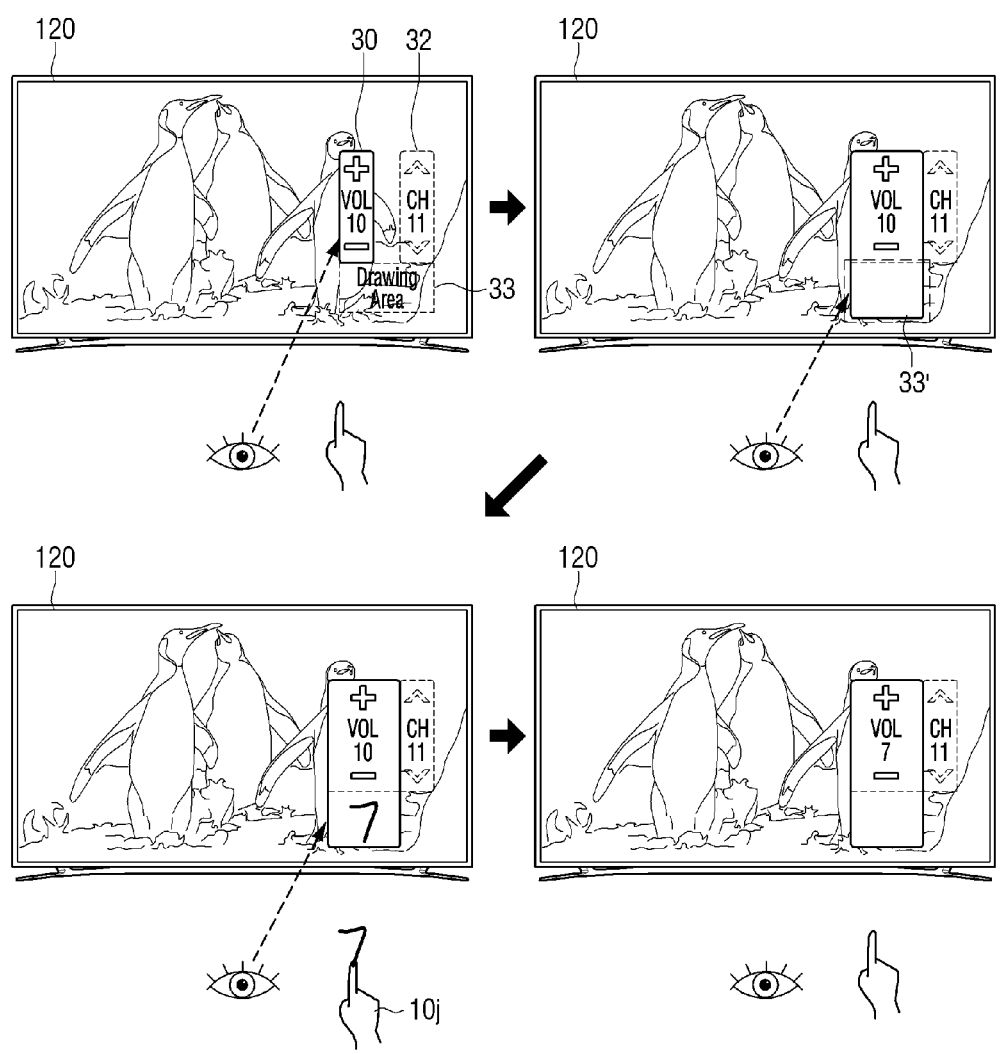

Referring to FIG. 23, if it is determined that an eye gaze of a user is directed toward the screen and the user's gesture is recognized, the controlling unit 130 displays an object associated with a control of the display apparatus 100. For example, the controlling unit 130 may display an object 30 for controlling volume and an object 32 for selecting a channel, and may also display a drawing area 33. If it is determined that an eye gaze of a user is directed toward the object 30 for volume control, the controlling unit 130 may enlarge and display the object 30 for the volume control and a drawing region 33' associated with the volume control. In this state, for example, if a gesture 10j drawing a figure of "7" is recognized, the controlling unit 130 may control the display unit 120 so that a trajectory of the recognized gesture is displayed on the drawing region 33', and may control the display apparatus 100 so as to change the volume to correspond to the figure of "7."

Figure 24:
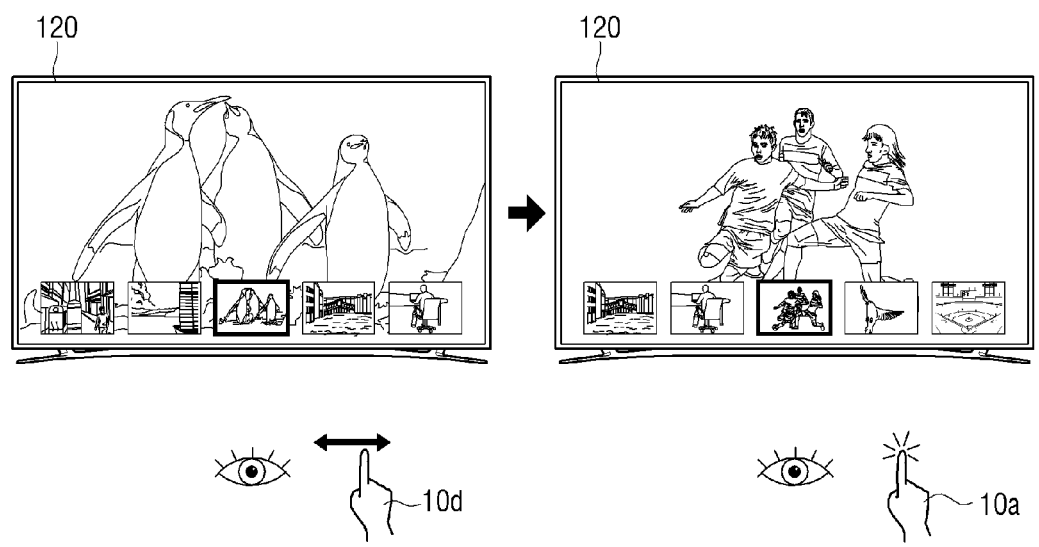

FIG. 24 illustrates an embodiment of the present invention.

Referring to FIG. 24, if it is determined that an eye gaze of a user is directed toward a lower end region of the screen and the user's gesture is sensed, channel lists may be displayed on the lower end region of the screen. In this state, if a gesture 10d directing from the right to the left, or from the left to the right, is recognized, the controlling unit 130 controls the display unit 120 so that the channel lists are sequentially focused and displayed along the gesture direction. Thereafter, if a tapping gesture 10a is sensed, the controlling unit 130 may control the display apparatus 100 so that a channel is changed to the channel that is focused at the time the tapping gesture is made.

In addition, according to an embodiment of the present invention, if it is determined that an eye gaze of a user is no longer directed toward the screen and a certain gesture is sensed within a preset time in this state, the controlling unit 130 may perform an event corresponding to the certain gesture. For example, referring to FIGS. 25A to 25C, while an eye gaze of a user is sensed in FIG. 25A, if it is determined that the eye gaze of the user is no longer sensed, a gesture 10k in which a palm is directed toward the screen within the preset time is recognized in FIG. 25B, and a fist gesture 10m is then recognized, the controlling unit 130 may control the display apparatus 100 so as to be operated in a mute state in FIG. 25C. Thereafter, if it is again recognized that an eye gaze of the user is directed toward the screen and the gesture 10k in which the palm is directed toward the screen is recognized, the controlling unit 130 may again control the display apparatus 100 so that a mute state is released. According to an embodiment of the present invention, for example, in the case in which the user gets a phone call while watching TV, the user may more intuitively and more quickly change the TV into the mute state.

Figure 26A:
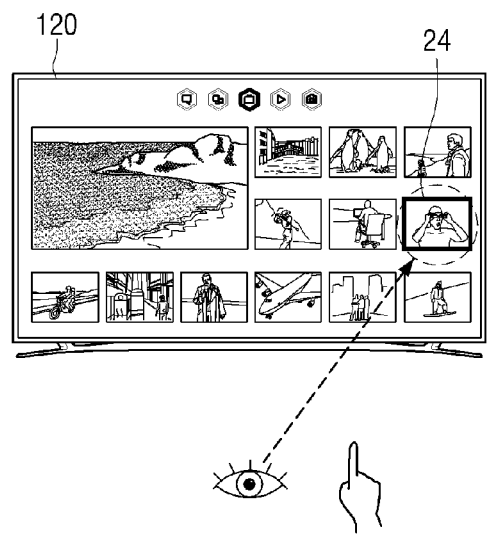
Figure 26B:
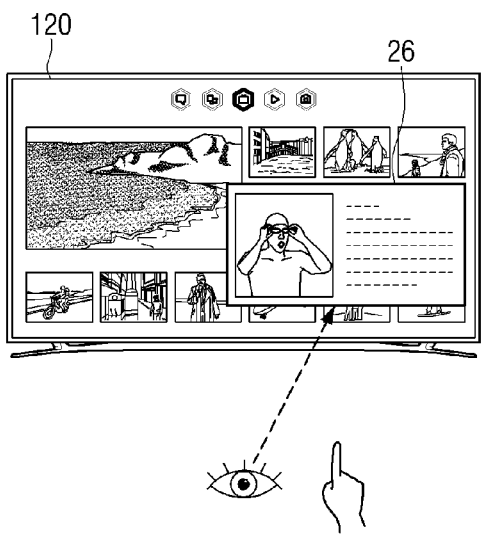
Figure 26C:
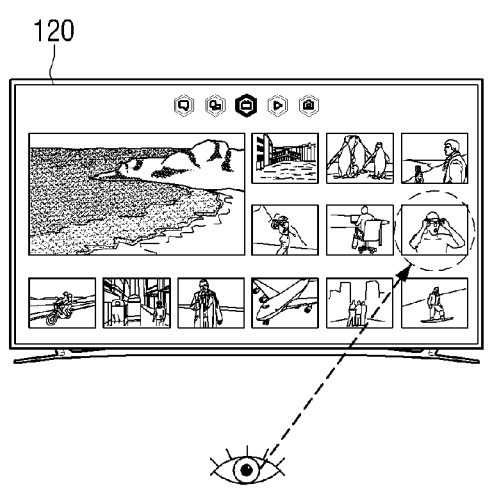

In FIGS. 26A to 26C, according to an embodiment of the present invention, the user may rapidly and conveniently receive detailed information on contents.

Referring to FIGS. 26A to 26C, the controlling unit 130 may control in FIG. 26A the display unit 120 so that an eye gaze of a user on the screen is detected if it is determined that the eye gaze of the user views the screen and a highlight (e.g. an edge) 24 is displayed on the object corresponding to the detected eye gaze of the user if the gesture is sensed. The controlling unit 130 may control the display unit 120 so that detailed information 26 on the corresponding object is automatically displayed in FIG. 26B if the preset time passes in this state and the display of the detailed information 26 is terminated in FIG. 26C if the user gesture is no longer sensed. In addition, if a gesture selected in the state in which the detailed information 26 is automatically displayed, for example, a tapping gesture with a finger is recognized, the controlling unit 130 enlarges and displays the detailed information so as to fill the overall screen. In the state in which the detailed information is displayed on the overall screen, even though the user gesture is not sensed, the controlling unit 130 controls the display unit 120 so that the display of the detailed information is maintained.

Figure 27A:
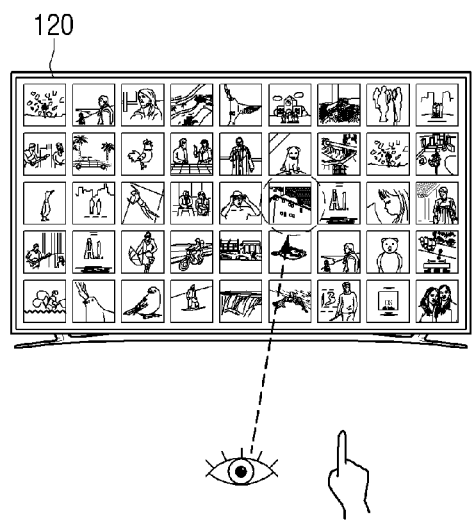
Figure 27B:
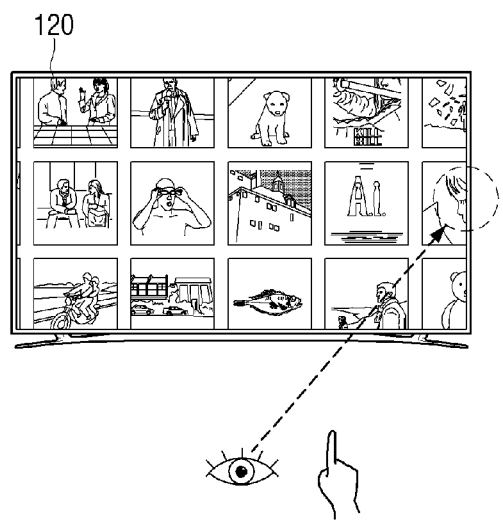
Figure 27C:
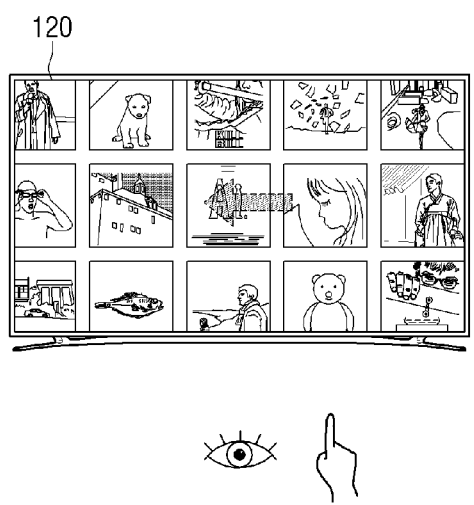

In FIGS. 27A to 27C, According to an embodiment of the present invention, in the case in which a significant amount of information is provided from one screen, a user may quickly and rapidly access necessary information.

Referring to FIGS. 27A to 27C, in a state in which thumbnails of a significant amount of contents are displayed on one screen, if it is determined that an eye gaze of the user is directed toward the screen and the user's gesture is sensed in FIG. 27A, the controlling unit 130 detects the eye gaze of the user and zooms-in on a peripheral region on the basis of the detected position of the eye gaze of the user in FIG. 27B. In a state in which a certain region of the screen is zoomed-in, if it is determined that the eye gaze of the user is positioned at an edge of the screen, the controlling unit 130 moves the screen so that a region outside the edge at which the eye gaze is positioned is displayed in FIG. 27C. If an eye gaze of the user and the gesture are not recognized, the controlling unit 130 controls the display unit 120 so as to return to the original screen, that is, the screen on which the thumbnails of a significant amount of contents are displayed at once.

In addition, according to the various embodiments of the present invention described above, since an eye gaze of a user is used to select an object, it is important to accurately detect an eye gaze. In order to increase the accuracy of the detection of an eye gaze, a correction for the detected eye gaze may be performed, and according to an embodiment of the present invention, the above-mentioned eye gaze correction may be performed without passing through inconvenient processes. An embodiment of the present invention is described below in greater detail.

The controlling unit 130 may detect an eye gaze of a user on the screen based on eye gaze information received from an external apparatus. However, since a detected eye gaze is not always accurate, the controlling unit 130 may additionally perform an eye gaze correction.

For example, if it is determined that a detected eye gaze does not correspond to a position at which an object is displayed and a preset user gesture is recognized, the controlling unit 130 may correct the eye gaze to a position at which an object closest to the detected eye gaze is displayed. In other words, since there is a user gesture trying to select an object that the user views, the eye gaze of the user may be corrected to a position of the object.

Figure 28:
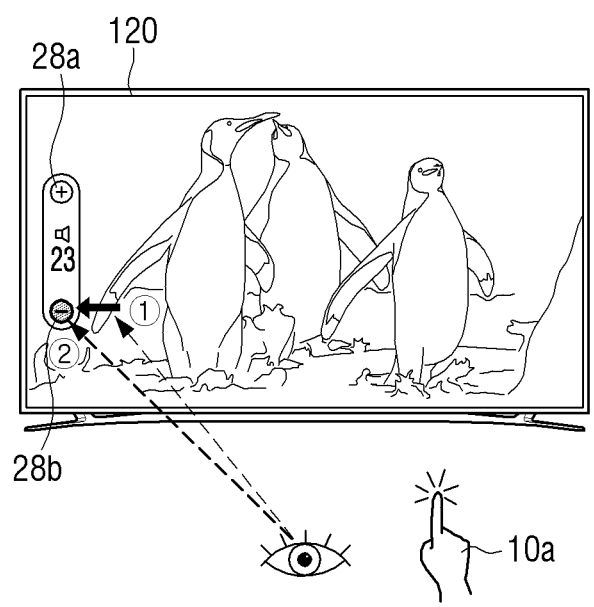
FIGS. 28 to 29E are diagrams illustrating eye gaze correction according to various embodiments of the present invention.

FIG. 28 is a diagram illustrating eye gaze correction according to an embodiment of the present invention.

Referring to FIG. 28, when a gesture 10*a* for object selection is sensed, if a detected eye gaze (0) is not directed toward any object displayed on the screen, the controlling unit 130 corrects the eye gaze to an object 28*b* displayed to be closest to the detected eye gaze (①). ② represents a corrected eye gaze. After the above-mentioned correction process is performed, even though the eye gaze of the user is later detected as being directed toward the position of ①, the controlling unit 130 may determine that an actual eye gaze of the user is directed toward the position of ②.

In addition, in performing the eye gaze correction described above, eye gaze guidance is important. To this end, according to an embodiment of the present invention, the controlling unit 130 may control the display unit 120 so that only optimal objects closest to the detected eye gaze are displayed, using the eye gaze detected before correcting the eye gaze. A description thereof will be provided below in greater detail with reference to FIGS. 29A to 29E.

FIGS. 29A to 29E are diagrams illustrating eye gaze correction according to an embodiment of the present invention.

Figure 29A:
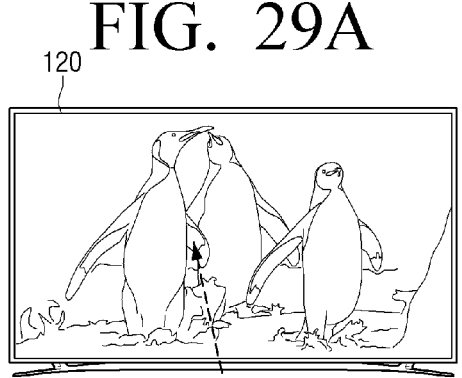
Figure 29B:
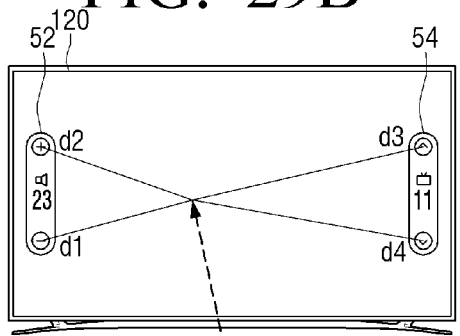
Figure 29C:
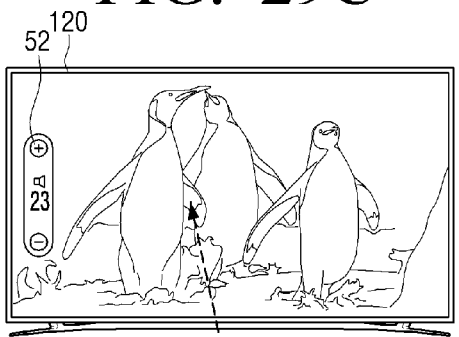
Figure 29D:
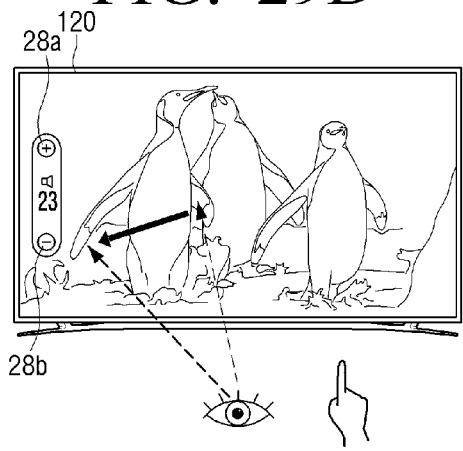
Figure 29E:
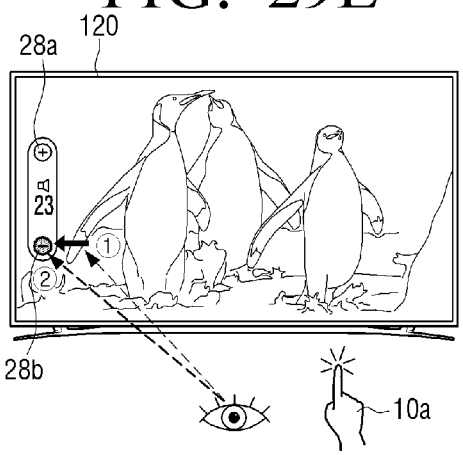

Referring to FIGS. 29A to 29E, if it is determined that an eye gaze of the user is directed toward the screen and a user gesture is recognized based on information received from an external apparatus, the controlling unit 130 detects the eye gaze of the user in FIG. 29A. In addition, in the case in which a volume control object 52 and a channel control object 54 may be displayed on the screen, the controlling unit 130 controls the display unit 120 so that only the volume control object 52 closest to the detected eye gaze in FIG. 29C is displayed, by considering a distance between the volume control object 52 and the channel control object 54, and the detected eye gaze in FIG. 29B. Thereafter, the user may move the eye gaze toward the object 52 for the volume control in order to control the volume in FIG. 29D, and in this state, in the case in which a user gesture for selecting the object is input, the controlling unit 130 corrects the eye gaze to an object 28*b* closest to the detected eye gaze of the user among selectable objects 28*a* and 28*b* in the object 52 for the volume control.

According to an eye gaze correction mechanism as described above, an inconvenient process for correcting the eye gaze (e.g. in a state in which the screen including a plurality of points is displayed, the user must focus on each of the points) may be omitted, and the eye gaze correction may be naturally performed during a process in which the user manipulates the display apparatus 100.

In addition, since positions of eyes, positions of pupils in the eyes, and the like, for each user are different, an eye gaze correction suitable for an individual user is required. In addition, even in the case of the same user, different eye gaze corrections must be applied according to a viewing form (e.g. a posture of the user, a distance between the user and the display apparatus, and the like). In this respect, according to an embodiment of the present invention, the controlling unit 130 may recognize the user, may determine a state of the user, and may perform the eye gaze detection according to the recognized user and/or the determined state of the user.

For example, the controlling unit 130 may perform a user recognition based on input user information and perform the eye gaze detection according to the recognized user. In this case, the user information may be user identification or a password, and may be preferably an image obtained by photographing the user. The controlling unit 130 may obtain a facial image of the user by removing a background region from the image obtained by photographing the user received from the external apparatus, extract a face region using edge and color information from the obtained face image of the user, recognize a face by extracting characteristic points such as eyes, nose, mouth, and the like, from the face region, and determine whether the recognized face is a pre-registered face of the user by comparing the recognized face with a pre-registered facial image. In this case, as a method for improving recognition speed, at the time of comparing the recognized face with a pre-registered facial image, the latest recognized facial information of the user is first compared with current facial information of the user.

The eye gaze correction may be performed by applying a correction corresponding to the user recognized as described above. For example, a storage unit of the display apparatus 100 may store performance results of the eye gaze correction for each user (e.g., a correction coefficient of a user A, a correction coefficient of a user B, and the like). That is, the results of the eye gaze correction performed during a process of manipulating the display apparatus as described in FIGS. 28 and 29A to 29E may be stored in the storage unit for each user.

Referring to FIG. 28, in the case in which a user A has previously performed an interaction as described in FIG. 28, such that the eye correction is performed, if the user A is subsequently recognized and the eye gaze of the user A is detected from the position ①, the controlling unit 130 may correct the eye gaze to the position ② by applying the stored correction performance results of the user A to the detected eye gaze.

According to an embodiment of the present invention, the controlling unit 130 may determine a viewing state of a user from information received from an external apparatus and perform eye gaze detection according to the determined viewing state. The information received from the external apparatus includes information necessary to classify the viewing state of the user. For example, the information received from the external apparatus may include an image obtained by photographing a portion of the body of the user.

In a method of determining a viewing state according to an embodiment of the present invention, the controlling unit 130 may classify positions of eyes of a user by analyzing information received from an external apparatus. For example, the controlling unit 130 may obtain a facial image of the user from an image obtained by photographing the user, extract the facial region using edge and color information from the obtained facial image of the user, and extract characteristic points such as the eyes, a nose, a mouth, and the like, from the facial region. The controlling unit 130 may identify where the characteristic points corresponding to the eyes are positioned from the photographed image, and determine where the eyes of the user are positioned in relationship to the display apparatus 100 by considering a position relationship between the external apparatus that photographed the user and the display apparatus 100.

In addition, the controlling unit 130 may additionally classify a gradient of the eyes of the user by analyzing the information received from the external apparatus. For example, the controlling unit 130 may detect the positions of the characteristics of two eyes from the facial image as described above, and calculate the gradient of a straight line connecting the two eyes.

In addition, the controlling unit 130 may additionally classify a distance between the user and the display apparatus 100. For example, the controlling unit 130 may calculate a size of at least one of the eyes, the nose, and the mouth from the facial image of the user and calculate how far away the face of the user is from the external apparatus that photographed the user by considering a perspective relationship. In addition, the controlling unit 130 may determine the distance between the user and the display apparatus 100 using a value obtained by adding the distance between the external apparatus and the display apparatus 100 to a distance between the external apparatus and the face of the user, or simply using only a distance value between the external apparatus and the face of the user.

The controlling unit 130 may determine a viewing state of a user by at least one of the positions of the eyes of the user, the gradient of the eyes, the distance between the display apparatus and the user, or a combination of information of at least two thereof. In addition, the controlling unit 130 may perform eye gaze detection according to the determined viewing state.

For example, the controlling unit 130 may store correction coefficients which are set to be different from each other for each of a first viewing state, a second viewing state, and a third viewing state, and may detect the eye gaze of the user by applying the correction coefficient corresponding to the first viewing state when the first viewing state is sensed.

Alternatively, for example, if the first viewing state is determined and the correction as described in FIGS. 28 and 29A to 29E is then performed, the controlling unit 130 may match the performed correction results to the first viewing state to be stored in the storage unit. In addition, if the first viewing state is subsequently sensed, the controlling unit 130 may detect the eye gaze of the user by correcting the eye gaze of the user, using the correction performance results matched to the first viewing state and stored in the storage unit.

In addition, although the case in which the controlling unit 130 performs the eye gaze detection according to the recognized user or the determined viewing state of the user has been described, the controlling unit 130 may perform the eye gaze detection by a combination of the recognized user and the determined viewing state of the user, according to an embodiment of the present invention. Therefore, accuracy of the detection of an eye gaze may be further increased.

According to an embodiment of the present invention described above, since entering into an interaction mode may be performed by a combination of a gesture and an eye gaze (e.g. a combination of a voicing and an eye gaze, or the like), an intention of a user may be more accurately detected than in a case in which only a gesture or an eye gaze is used. In addition, since eye gaze correction is naturally performed during a process of performing an interaction, an inconvenient process which should be separately performed for eye gaze correction may be omitted.

Figure 30:
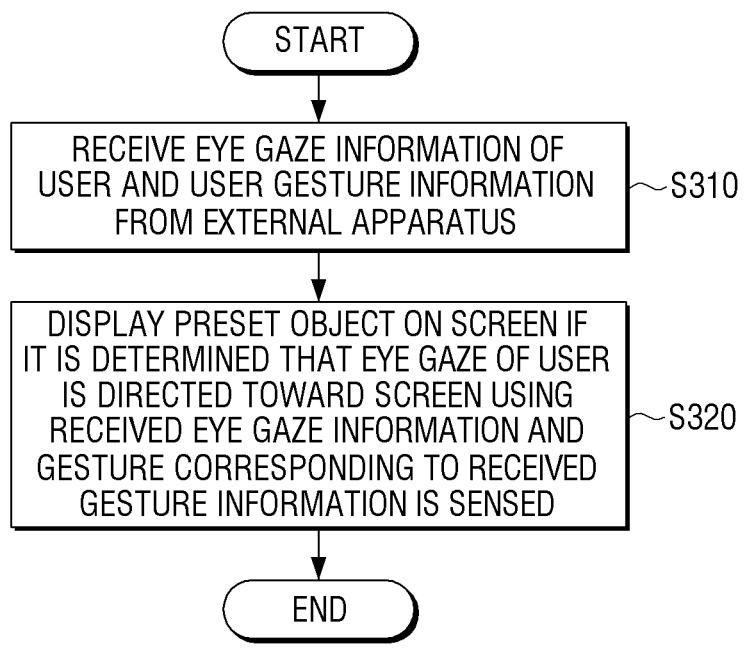
FIGS. 30 to 32 are flowcharts of methods of controlling a display apparatus according to various embodiments of the present invention.

FIG. 30 is a flowchart of a method of controlling a display apparatus 100 in accordance with an embodiment of the present invention.

Referring to FIG. 30, the display apparatus 100 receives eye gaze information of a user and user gesture information from an external apparatus in step S310. In this case, the external apparatus may be an apparatus which is disposed to be relatively adjacent to the user in order to collect the eye gaze information of the user, the user gesture information, and the like. In a certain case, the external apparatus may be implemented as an internal component of the display apparatus 100. The external apparatus may collect voice information of the user as well as eye gaze information and gesture information. In addition, the external apparatus transmits the collected information to the display apparatus 100.

In this case, the transmitted information may be unprocessed or processed information. The unprocessed information indicates the image obtained by photographing a portion of the body of a user, for example, and processed information indicates information obtained by identifying a user gesture included in the image obtained by photographing the portion of the body of the user. In the case in which the unprocessed information is transmitted to the display apparatus 100, the controlling unit of the display apparatus 100 may process the information as in an embodiment of the present invention described above.

In addition, if it is determined that an eye gaze of the user is directed toward the screen using eye gaze information received from the external apparatus and the user gesture corresponding to the received gesture information is sensed, the display apparatus 100 displays the preset object on the screen in step S320. That is, in the case in which the user gesture and the eye gaze of the user are recognized, the preset object may be displayed. Instead of the gesture, a voicing of the user may be used.

In this case, the object may be displayed in a deactivation state which may not be selected by the user and may be displayed in an activation state after it is determined that the eye gaze of the user is directed toward the object. In order to indicate that the object is activated, a size of the object may be increased, or a highlight or an edge may be displayed on the object. In other words, the object at which the eye gaze of the user is directed toward may be varied so as to be distinguished from the remaining objects at which the eye gaze of the user is not directed toward.

Figure 31:
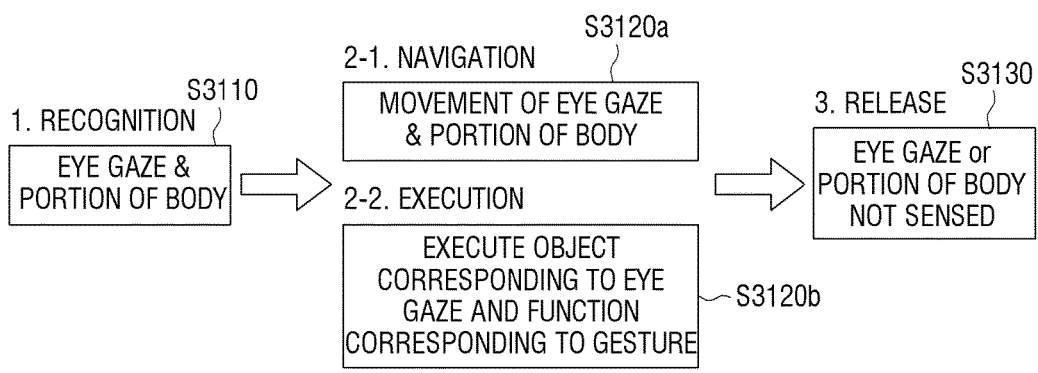

FIG. 31 is a flow chart of a method of controlling a display apparatus according to an embodiment of the present invention.

Referring to FIG. 31, the overall operation of the display apparatus 100 according to an embodiment of the present invention may be classified into operations such as <1. recognition>, <2-1. navigation>, <2-2. execution>, and <3. release>. If a portion of the body of a user and an eye gaze of the user is sensed, the display apparatus 100 enters into an interaction mode in step S3110. In this case, information related to the screen which is currently displayed on the display apparatus 100, or information on executable functions in a current state may be provided to the user in various forms such as a text, an image, a video, a sound, and the like. For example, objects such as selectable menus or icons may be displayed on the display apparatus 100.

Thereafter, if a movement of the eye gaze to the objects such as the menus or icons displayed on the display apparatus 100 is sensed, a navigation operation is performed according to the movement of the eye gaze in step S3120*a*. In this case, a visual effect for informing to where the eye gaze is directed toward may be provided. For example, a form of the icon at which the eye gaze is directed toward may be changed (e.g., highlighted) to be different from a form of the icon at which the eye gaze is not directed toward.

In a state in which the eye gaze of the user is directed toward a certain object displayed on the display apparatus 100, if the preset gesture is sensed, a function corresponding to the certain object and a preset gesture is executed in step (S3120*b*). Since the above-mentioned step is described in detail in an embodiment of the present invention described above, a duplicate description is omitted.

In addition, the interaction between the user and the display apparatus 100 described above may be performed only in the case in which an eye gaze of a user and a portion of the body of the user are sensed. That is, if any one of an eye gaze of the user and the portion of the body of the user is not sensed, the interaction mode is released in step S3130.

Figure 32:
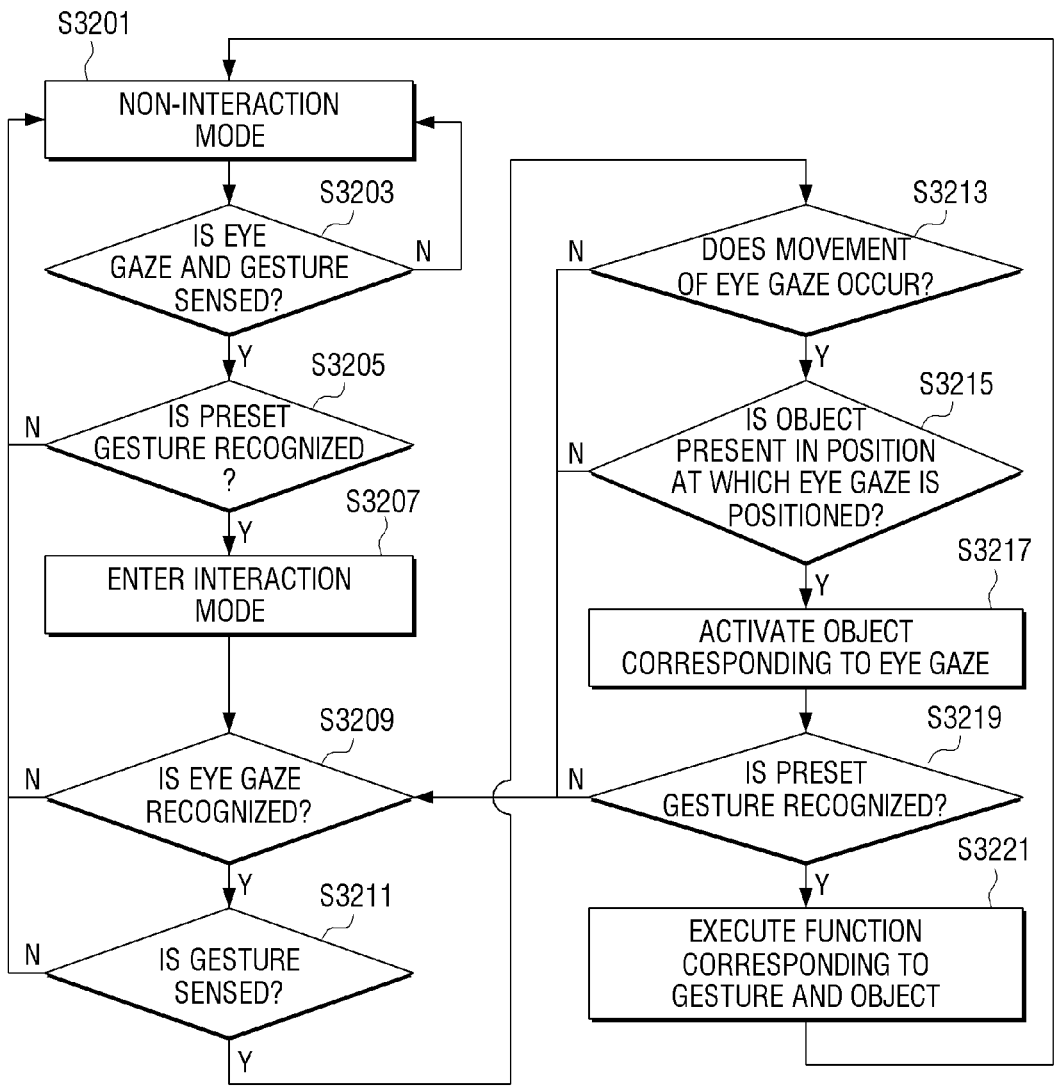

FIG. 32 is a flow chart of a method of controlling a display apparatus according to an embodiment of the present invention.

Referring to FIG. 32, the display apparatus 100 is in a state of a non-interaction mode in step S3201. In the non-interaction mode, the display apparatus 100 determines whether a gesture, that is, a portion of the body of a user and an eye gaze are sensed in step S3203. If it is not determined that a gesture and an eye gaze are sensed, the non-interaction mode is maintained, and if it is determined that a gesture and an eye gaze are sensed, it is determined whether the preset gesture is recognized in step S3205. In this case, the preset gesture, which is a gesture for the display apparatus 100 to enter into the interaction mode, includes various forms such as a certain formation of a hand, a certain voicing, a certain sound, and the like.

If it is determined that the preset gesture is recognized, the display apparatus 100 enters the interaction mode in step S3207. That is, a user interface (UI) screen for interacting with the user is displayed on the display unit of the display apparatus 100. The UI screen includes selectable objects and the objects are associated with an execution of a function of the display apparatus 100.

If it is determined that the eye gaze is recognized in the interaction mode in step S3209, it is determined that the gesture is sensed in step S3211, and it is determined that a movement of the eye gaze occurs in step S3213, the display apparatus 100 determines whether the object is present at a position at which the eye gaze is directed toward in step S3215. If the object is present at the position at which the eye gaze is directed toward, the display apparatus 100 activates the object corresponding to the eye gaze in step S3217. In this case, the activating of the object indicates that the object corresponding to the eye gaze is displayed to be distinguished from the objects which do not correspond to the eye gaze. Thereafter, if it is determined that the preset gesture is recognized in step S3219, the function corresponding to the gesture and the object is executed in step S3221. After executing the function, the display apparatus 100 may enter the non-interaction mode.

In addition, the display apparatus 100 may correct the detected eye gaze of the user in a series of operations described above. Since the above-mentioned operations have been described in detail in an embodiment of the present invention described above, a duplicate description is omitted.

By the display method of the display apparatus according to an embodiment of the present invention described above, a user may be provided with an object for controlling the display apparatus 100 only in the case in which an eye gaze and a gesture are recognized. Therefore, the display of the object covering the screen in the case which is not intended by the user may be prevented. In addition, since eye gaze correction is naturally performed during the interaction between the user and the display apparatus, an inconvenient process which should be separately performed for eye gaze correction may be omitted.

In addition, a method of controlling the display apparatus according to an embodiment of the present invention described above may be implemented in a program so as to be provided to the display apparatus or an input apparatus. For example, the program including the method of controlling the display apparatus may be stored and provided in a non-transitory computer-readable recording medium.

The non-transitory computer-readable recording medium does not indicate a medium storing data for a short period such as a register, a cache, a memory, or the like, but indicates a machine-readable recording medium semi-permanently storing the data. For example, various applications or programs described above may be stored and provided in the non-transitory computer-readable recording medium such as a compact disc (CD), a digital versatile disk (DVD), a hard disk, a Blu-ray disk, a universal serial bus (USB), a memory card, a read-only memory (ROM), or the like.

Although the embodiments of the present invention have been shown and described above, it should be understood that the present invention is not limited to the disclosed embodiments and may be variously changed without departing from the scope and spirit of the present invention. Accordingly, such modifications, additions and substitutions may fall within the scope of the present invention as defined by the appended claims and their equivalents.

What is claimed is:

1. A display apparatus, comprising:
a communication circuit;
a display; and
a processor configured to:
control the communication circuit to receive eye gaze information of a user and user gesture information from an external apparatus,
control the display to display a user interface (UI) element for receiving a user input based on an eye gaze and a gesture in response to determining that an eye gaze of the user toward the display and a user gesture are simultaneously detected based on the received eye gaze information and the received gesture information, and
if any one of the eye gaze of the user directed toward the display and the user gesture is not recognized for at least a preset time after the UI element is displayed, control the display to terminate the display of the UI element.

2. The display apparatus as claimed in claim 1, wherein the processor is further configured to detect the eye gaze of the user directed toward the display.

3. The display apparatus as claimed in claim 2, wherein if it is determined that the detected eye gaze does not correspond to a position on which the UI element is displayed and a preset user gesture is recognized, the processor is further configured to correct the detected eye gaze to a position on which a second UI element closest to the detected eye gaze is displayed.

4. The display apparatus as claimed in claim 2, wherein the processor is further configured to perform recognition of the user based on user input information and perform eye gaze detection according to the recognition of the user.

5. The display apparatus as claimed in claim 2, wherein the processor is further configured to determine a viewing state of the user from information received from the external apparatus and perform eye gaze detection according to the determined viewing state.

6. The display apparatus as claimed in claim 1, wherein if it is determined that the eye gaze of the user is directed toward the displayed UI element and a preset user gesture is recognized, the processor is further configured to perform an operation corresponding to the UI element toward which the eye gaze of the user is directed and the preset user gesture.

7. The display apparatus as claimed in claim 1, wherein the processor is further configured to:
   control the display to display a plurality of UI elements including the UI element, and
   in response to determining that the eye gaze of the user is directed toward the UI element, control the display to display the UI element differently from remaining UI elements of the plurality of UI elements.

8. The display apparatus as claimed in claim 1, wherein if it is determined that the eye gaze of the user is directed toward the UI element, the processor is further configured to vary the UI element and display the UI element in the varied state, and
   if it is determined that the eye gaze of the user is directed toward the UI element and then is directed toward an area of the display where the UI element is not displayed while the UI element is displayed in the varied state and a preset user gesture is recognized, the processor is further configured to perform an operation corresponding to the UI element and the preset user gesture.

9. The display apparatus as claimed in claim 1, wherein the UI element is at least one of a sound adjustment object, a channel adjustment object, a search box activation object, a keyboard object, and a guide object.

10. The display apparatus as claimed in claim 1, wherein the communication circuit is further configured to receive the user gesture information from a wearable device worn by the user.

11. A method of controlling a display apparatus, the method comprising:
    receiving eye gaze information of a user and user gesture information from an external apparatus;
    displaying a user interface (UI) element for receiving a user input based on an eye gaze and a gesture on a screen of the display apparatus in response to determining that an eye gaze of the user toward the screen and a user gesture are simultaneously detected based on the received eye gaze information and the received user gesture information; and
    if any one of the eye gaze of the user directed toward the screen and the user gesture is not recognized for at least a preset time after the first object is displayed, terminating the display of the UI element.

12. The method as claimed in claim 11, further comprising detecting the eye gaze of the user on the screen.

13. The method as claimed in claim 12, further comprising if it is determined that the detected eye gaze does not correspond to a position on which the UI element is displayed and a preset user gesture is recognized, correcting the detected eye gaze to a position on which a second UI element closest to the detected eye gaze is displayed.

14. The method as claimed in claim 12, wherein detecting the eye gaze of the user on the screen comprises performing a user recognition based on user input information and performing an eye gaze detection according to the user recognition.

15. The method as claimed in claim 12, wherein detecting the eye gaze of the user on the screen comprises determining a viewing state of the user from information received from the external apparatus and performing an eye gaze detection according to the determined viewing state.

16. The method as claimed in claim 11, further comprising if it is determined that the eye gaze of the user is directed toward the displayed UI element and the preset user gesture is recognized, performing an operation corresponding to the displayed UI element toward which the eye gaze of the user is directed and the preset user gesture.

17. The method as claimed in claim 11, wherein displaying the UI element comprises displaying a plurality of UI elements including the UI element, and
    herein the method further comprises in response to determining that the eye gaze of the user is directed toward the UI element, displaying the UI element differently from remaining UI elements of the plurality of UI elements.

18. The method as claimed in claim 11, further comprising:
    if it is determined that the eye gaze of the user is directed toward the UI element, varying the UI element and displaying the UI element in the varied state, and
    if it is determined that the eye gaze of the user is directed toward the UI element and then is directed toward an area of the display apparatus where the UI element is not displayed while the UI element is displayed in the varied state and a preset user gesture is recognized, performing an operation corresponding to the UI element and the preset user gesture.

19. The display apparatus as claimed in claim 1, wherein the processor is configured to display the UI element in response to sensing both the eye gaze of the user directed toward the display and the user gesture, regardless of whether the eye gaze or the user gesture is sensed first.

20. The method as claimed in claim 11, wherein displaying a UI element comprises displaying the UI element in response to sensing both the eye gaze of the user directed toward the display and the user gesture, regardless of whether the eye gaze or the user gesture is sensed first.

* * * * *